United States Patent
Wroblewski et al.

(10) Patent No.: US 12,520,020 B2
(45) Date of Patent: Jan. 6, 2026

(54) VIDEO-RECORDING DOORBELL

(71) Applicant: Google LLC, Mountain View, CA (US)

(72) Inventors: Alexander P. Wroblewski, San Francisco, CA (US); Arun Prakash Raghupathy, Mountain View, CA (US); Douglas Harrington, San Jose, CA (US)

(73) Assignee: Google LLC, Mountain View, CA (US)

( * ) Notice: Subject to any disclaimer, the term of this patent is extended or adjusted under 35 U.S.C. 154(b) by 23 days.

(21) Appl. No.: 18/565,977

(22) PCT Filed: Aug. 1, 2022

(86) PCT No.: PCT/US2022/074404
§ 371 (c)(1),
(2) Date: Nov. 30, 2023

(87) PCT Pub. No.: WO2024/030151
PCT Pub. Date: Feb. 8, 2024

(65) Prior Publication Data
US 2025/0106489 A1   Mar. 27, 2025

(51) Int. Cl.
*H04N 23/51* (2023.01)
*H04N 5/77* (2006.01)
*H04N 7/18* (2006.01)

(52) U.S. Cl.
CPC ............ *H04N 23/51* (2023.01); *H04N 7/186* (2013.01); *H04N 5/77* (2013.01)

(58) Field of Classification Search
CPC .......... H04N 23/51; H04N 7/186; H04N 5/77; H04N 23/55; H04N 23/52; H04M 1/0291
See application file for complete search history.

(56) References Cited

U.S. PATENT DOCUMENTS

| | | | |
|---|---|---|---|
| 2019/0372180 A1* | 12/2019 | Tso | H04N 23/56 |
| 2020/0042555 A1* | 2/2020 | Duda | H04N 21/25841 |
| 2020/0159091 A1* | 5/2020 | Vitale | G03B 17/08 |

FOREIGN PATENT DOCUMENTS

| | | |
|---|---|---|
| CN | 112752008 | 5/2021 |
| WO | 2013150621 | 10/2013 |
| WO | 2022072057 | 4/2022 |

OTHER PUBLICATIONS

"International Preliminary Report on Patentability", Application No. PCT/US2022/074404, Feb. 4, 2025, 12 pages.
"International Search Report and Written Opinion", Application No. PCT/US2022/074404, Jun. 12, 2023, 17 pages.
"Invitation to Pay Additional Fees and Partial Search Report", Application No. PCT/US2022/074404, Apr. 5, 2023, 4 pages.

* cited by examiner

*Primary Examiner* — Jared Walker
(74) *Attorney, Agent, or Firm* — Colby Nipper PLLC

(57) ABSTRACT

The present document describes a video-recording doorbell. In aspects, the video-recording doorbell provides a compact, space-efficient, electronic-doorbell camera device. Thermal control is enhanced by dividing the heat sink into separate sections for different heat-dissipating subassemblies. The video-recording doorbell includes a robust waterproofing system that enables mechanical movement of the button when a user presses the button to initiate a chime event. For an enhanced user experience, the video-recording doorbell also includes a mounting system that is easy to install and provides added security against theft.

20 Claims, 22 Drawing Sheets

VIDEO-RECORDING DOORBELL

RELATED APPLICATION(S)

This application is a national stage entry of International Application No. PCT/US2022/074404, filed Aug. 1, 2022, the disclosure of which is incorporated herein by reference in its entirety.

BACKGROUND

With advances in electronic doorbells for capturing images and/or videos, many users have begun to rely on their doorbell image data to view and/or identify a person that approached the user's doorstep or determine if a package has been delivered or taken. Many conventional electronic doorbells may be large and bulky, which may decrease a user experience. Some challenges that arise in constructing an electronic doorbell with a small form factor may include thermal management, waterproofing, powering, and mounting.

SUMMARY

The present document describes a video-recording doorbell. In aspects, the video-recording doorbell provides a compact, space-efficient, electronic-doorbell camera device. Thermal control is enhanced by dividing the heat sink into separate sections for different heat-dissipating subassemblies. The video-recording doorbell includes a robust waterproofing system, part of which enables mechanical movement of the button when a user presses the button to initiate a chime event. For an enhanced user experience, the video-recording doorbell also includes a mounting system that is easy to install and provides added security against theft.

According to an aspect, a video-recording doorbell includes a housing having a front exterior surface and an opposing rear exterior surface. In some implementations, the housing has a height along a y-axis that is greater than a width along an x-axis and a depth along a z-axis, the front exterior surface being normal to the z-axis. In some implementations, the front exterior surface has first and second opposing ends along the y-axis. The video-recording doorbell may also include a camera module disposed at the first end (e.g., upper end) of the housing. In some implementations, the camera module is configured to operate an image sensor and associated circuitry to capture video data. The video-recording doorbell may also include a printed circuit board disposed within the housing and having circuitry configured for continuous recording and interpretation of the video data. In addition, the video-recording doorbell may include a button subassembly disposed at the second end (e.g., lower end) of the housing and configured to be pressed by a person to initiate a chime event. Further, the video-recording doorbell may include a heat sink having a separate first and second sections. In some implementations, the first section of the heat sink is disposed adjacent to the printed circuit board, the second section of the heat sink disposed adjacent to the camera module. In some implementations, the first section is positioned adjacent to the second section, with a predefined gap in the direction of the y-axis.

According to an aspect, a video-recording doorbell includes a housing having a front exterior surface and an opposing rear exterior surface. The video-recording doorbell may also include a camera module. In some implementations, the camera module is configured to operate an image sensor and associated circuitry to capture video data. In some implementations, the camera module has a camera lens. The video-recording doorbell may also include a printed circuit board disposed within the housing and having circuitry configured for continuous recording of the video data. In addition, the video-recording doorbell may include a button subassembly configured to be pressed by a person to initiate a chime event. The button subassembly may include button board having an electrical pattern for initiating the chime event; a dome configured to complete a circuit when forced to contact the electrical pattern; an elastic button that is collapsible to apply force to the dome to cause the dome to contact the electrical pattern and complete the circuit; and a button cap forming a pressable button on the front exterior surface of the housing. The video-recording doorbell device may further comprise a first seal disposed between the button board and a front housing component of the housing; and a second seal disposed between the button board and the elastic button. Therein, the first and second seals may prevent water ingress in the housing between the housing and a button cap of the button subassembly from reaching the electrical pattern on the button board.

According to an aspect, a video-recording doorbell includes a housing having a front exterior surface and an opposing rear exterior surface. The video-recording doorbell may also include a camera module. In some implementations, the camera module is configured to operate an image sensor and associated circuitry to capture video data. The video-recording doorbell may also a printed circuit board disposed within the housing and having circuitry configured for continuous recording of the video data. In addition, the video-recording doorbell may include a button subassembly configured to be pressed by a person to initiate a chime event. The video-recording doorbell device may further comprise one or more mounting studs disposed on the rear exterior surface of the housing. Therein, a respective mounting stud of the one or more mounting studs may be fixed to a fastener disposed within the housing. The respective mounting stud may include a shaft that extends outwardly from the rear exterior surface of the housing; and a head having a diameter greater than that of the shaft.

According to an aspect, a video-recording doorbell includes a housing having a front exterior surface and an opposing rear exterior surface. The video-recording doorbell may also include a camera module. In some implementations, the camera module is configured to operate an image sensor and associated circuitry to capture video data. In some implementations, the camera module has a camera lens. The video-recording doorbell may also a printed circuit board disposed within the housing and having circuitry configured for continuous recording of the video data. In addition, the video-recording doorbell may include a button subassembly configured to be pressed by a person to initiate a chime event for a predefined duration of time. The button subassembly may further include a button board having an electrical pattern for initiating the chime event and a dome configured to complete a circuit when forced to contact the electrical pattern, the circuit configured to route line power to a chime for the predefined duration of time. Also, the video-recording doorbell may include a battery frame configured to accommodate a battery for providing power to the circuitry during the chime event.

This summary is provided to introduce simplified concepts of a video-recording doorbell, which are further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of a video-recording doorbell are described in this document with reference to the following drawings. The same numbers are used throughout the drawings to reference like features and components.

DETAILED DESCRIPTION

Figure 1A:
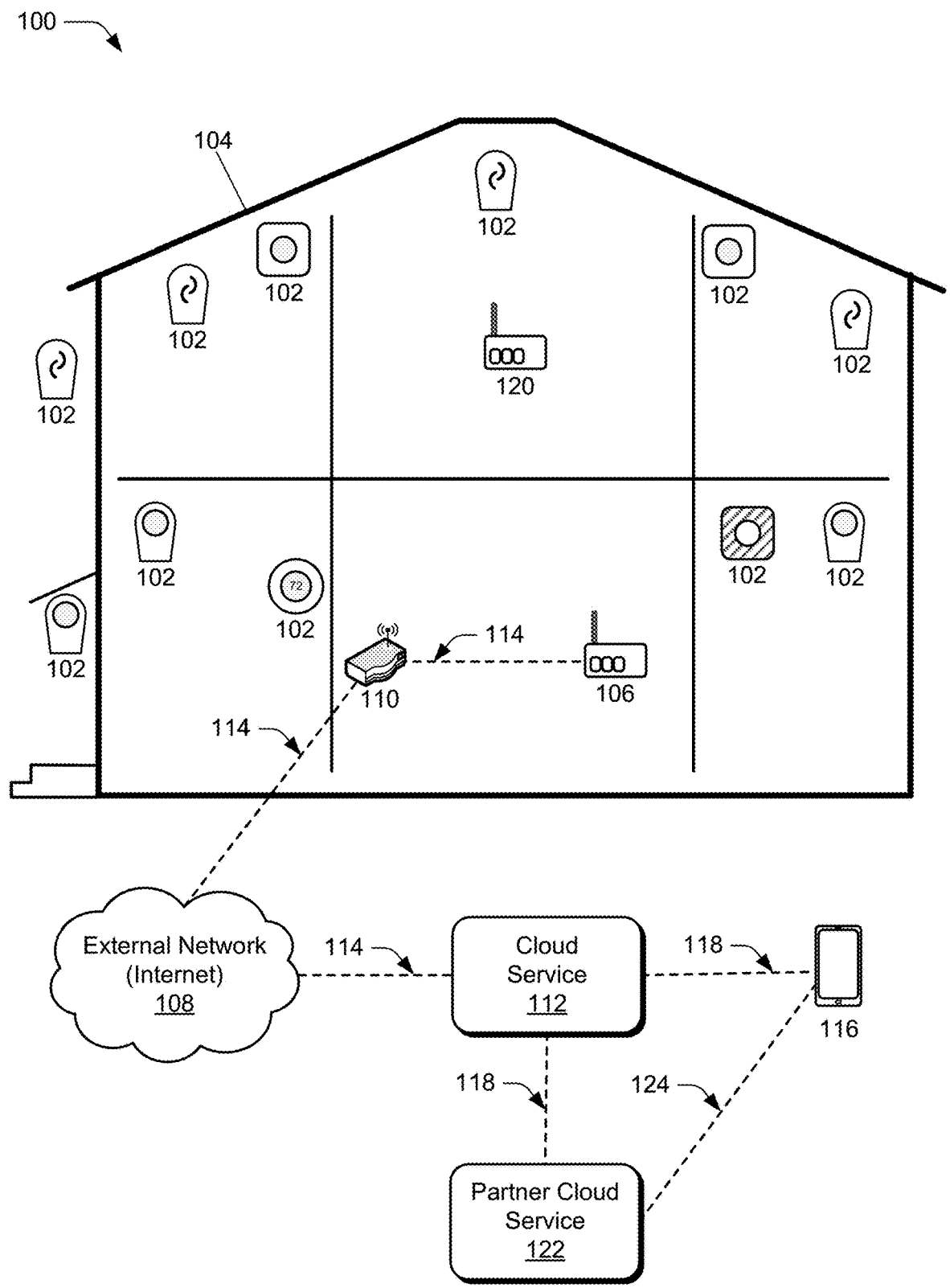
FIG. 1A is an example network environment in which various aspects of a video-recording doorbell can be implemented.

The present document describes a video-recording doorbell. The techniques described herein provide a video-recording doorbell device comprising a housing, a button, and a camera module. The doorbell has enhanced passive thermal control and more-robust waterproofing over many conventional video-recording doorbells and a mounting system that includes simple installation and increases security against theft.

In aspects, the video-recording doorbell includes a heat sink having separate sections, one corresponding to a camera module and another corresponding to a printed circuit board (PCB) (e.g., main logic board (MLB)) of the doorbell. Dividing the heat sink into separate sections for the different heat-generating components and/or subassemblies provides a significant reduction in temperature over conventional doorbell devices that use a single heat sink for both the MLB and the camera module. Separate sections also prevent heat from some components being spread to other susceptible components.

For waterproofing, the video-recording doorbell includes waterproofing seals disposed at locations within the housing of the doorbell. Based on the location of these seals, water may ingress around the edges of the button (e.g., between the button and the housing) into some areas behind the button but not to areas or components vulnerable to water damage, including circuitry. The placement of these seals enables mechanical movement of the button and light-ring features without risking water damage to circuitry (e.g., circuitry that triggers the chime event).

For mounting, the video-recording doorbell includes a mounting system used to secure the doorbell to a surface and prevent movement in any direction. In aspects, the doorbell includes mounting studs, which extend from a rear exterior surface of the doorbell and include a wide head. The mounting studs are inserted through holes in a wall plate and the doorbell is slid into place to overlap the head of the mounting stud behind the wall plate. The wall plate also includes a locking tab, which extends into a recessed volume defined in the rear exterior surface of the doorbell. Then, a lock fastener is inserted through a hole in the housing of the doorbell and fastened to the locking tab to prevent movement of the doorbell relative to the wall plate.

Additionally, the video-recording doorbell is line powered but includes a battery to power the device during a chime event (e.g., activation of the chime based on a user pressing the button). Because the battery is only used during the chime event, the battery may be smaller than conventional battery-powered video-recording doorbells, which require longer periods of sustained battery power. A smaller-sized battery enables a smaller form factor for the doorbell than many conventional battery-powered video-recording doorbells.

Thus, computing systems and devices are provided with more efficient techniques for installation, prevention of water ingress, and passive thermal control. These disclosed systems and devices thereby increase the effectiveness, efficiency, and user satisfaction with such systems and devices.

While features and concepts of the described techniques for video-recording doorbell can be implemented in any number of different environments, aspects are described in the context of the following examples.

Example Device

FIG. 1A illustrates an example network environment 100 (e.g., network environment) in which video-recording doorbell can be implemented. The network environment 100 includes a home area network (HAN). The HAN includes wireless network devices 102 (e.g., electronic devices) that are disposed about a structure 104, such as a house, and are connected by one or more wireless and/or wired network technologies, as described below. The HAN includes a border router 106 that connects the HAN to an external network 108, such as the Internet, through a home router or access point 110.

To provide user access to functions implemented using the wireless network devices 102 in the HAN, a cloud service 112 connects to the HAN via a border router 106, via a secure tunnel 114 through the external network 108 and the access point 110. The cloud service 112 facilitates communication between the HAN and internet clients 116, such as apps on mobile devices, using a web-based application programming interface (API) 118. The cloud service 112 also manages a home graph that describes connections and relationships between the wireless network devices 102, elements of the structure 104, and users. The cloud service 112 hosts controllers which orchestrate and arbitrate home automation experiences, as described in greater detail below.

The HAN may include one or more wireless network devices 102 that function as a hub 120. The hub 120 may be a general-purpose home automation hub, or an application-specific hub, such as a security hub, an energy management hub, a heating, ventilation, and air conditioning (HVAC) hub, and so forth. The functionality of a hub 120 may also be integrated into any wireless network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 1B:
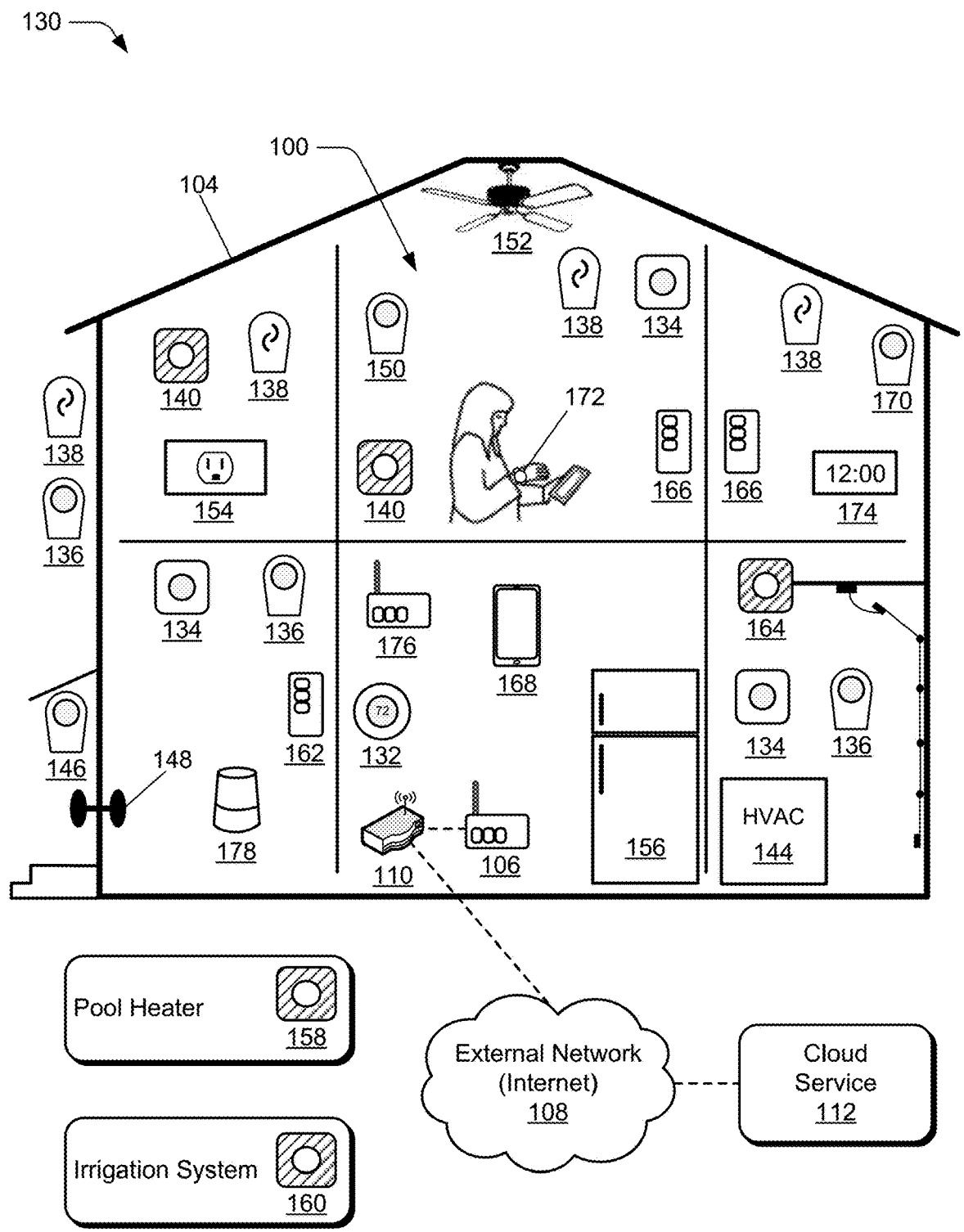
FIG. 1B illustrates the example environment from FIG. 1A in more detail.

FIG. 1B illustrates an example environment 130 in which a home area network, as described with reference to FIG. 1A, and aspects of a video-recording doorbell can be implemented. Generally, the environment 130 includes the home area network (HAN) implemented as part of a home or other type of structure with any number of wireless network devices (e.g., wireless network devices 102) that are configured for communication in a wireless network. For example, the wireless network devices can include a thermostat 132, hazard detectors 134 (e.g., for smoke and/or carbon monoxide), cameras 136 (e.g., indoor and outdoor), lighting units 138 (e.g., indoor and outdoor), and any other types of wireless network devices 140 that are implemented inside and/or outside of a structure 142 (e.g., in a home environment). In this example, the wireless network devices can also include any of the previously described devices, such as a border router 106, as well as a mobile device (E.g., smartphone) having the internet client 116.

In the environment 130, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIGS. 6 to 17C.

In implementations, the thermostat 132 may include a Nest® Learning Thermostat that detects ambient climate characteristics (e.g., temperature and/or humidity) and controls an HVAC system 144 in the home environment. The learning thermostat 132 and other network-connected devices "learn" by capturing occupant settings to the devices. For example, the thermostat learns preferred temperature set points for mornings and evenings, and when the occupants of the structure are asleep or awake, as well as when the occupants are typically away or at home.

A hazard detector 134 can be implemented to detect the presence of a hazardous substance or a substance indicative of a hazardous substance (e.g., smoke, fire, or carbon monoxide). In examples of wireless interconnection, a hazard detector 134 may detect the presence of smoke, indicating a fire in the structure, in which case the hazard detector that first detects the smoke can broadcast a low-power wake-up signal to all of the connected wireless network devices. The other hazard detectors 134 can then receive the broadcast wake-up signal and initiate a high-power state for hazard detection and to receive wireless communications of alert messages. Further, the lighting units 138 can receive the broadcast wake-up signal and activate in the region of the detected hazard to illuminate and identify the problem area. In another example, the lighting units 138 may activate in one illumination color to indicate a problem area or region in the structure, such as for a detected fire or break-in, and activate in a different illumination color to indicate safe regions and/or escape routes out of the structure.

In various configurations, the wireless network devices 140 can include an entryway interface device 146 that functions in coordination with a network-connected door lock system 148, and that detects and responds to a person's approach to or departure from a location, such as an outer door of the structure 142. The entryway interface device 146 can interact with the other wireless network devices based on whether someone has approached or entered the smart-home environment. An entryway interface device 146 can control doorbell functionality, announce the approach or departure of a person via audio or visual means, and control settings on a security system, such as to activate or deactivate the security system when occupants come and go. The wireless network devices 140 can also include other sensors and detectors, such as to detect ambient lighting conditions, detect room-occupancy states (e.g., with an occupancy sensor 150), and control a power and/or dim state of one or more lights. In some instances, the sensors and/or detectors may also control a power state or speed of a fan, such as a ceiling fan 152. Further, the sensors and/or detectors may detect occupancy in a room or enclosure and control the supply of power to electrical outlets or devices 154, such as if a room or the structure is unoccupied.

The wireless network devices 140 may also include connected appliances and/or controlled systems 156, such as refrigerators, stoves and ovens, washers, dryers, air conditioners, pool heaters 158, irrigation systems 160, security systems 162, and so forth, as well as other electronic and computing devices, such as televisions, entertainment systems, computers, intercom systems, garage-door openers 164, ceiling fans 152, control panels 166, and the like. When plugged in, an appliance, device, or system can announce itself to the home area network as described above and can be automatically integrated with the controls and devices of the home area network, such as in the home. It should be noted that the wireless network devices 140 may include devices physically located outside of the structure, but within wireless communication range, such as a device controlling a swimming pool heater 158 or an irrigation system 160.

As described above, the HAN includes a border router 106 that interfaces for communication with an external network, outside the HAN. The border router 106 connects to an access point 110, which connects to the external network 108, such as the Internet. A cloud service 112, which is connected via the external network 108, provides services related to and/or using the devices within the HAN. By way of example, the cloud service 112 can include applications for connecting end-user devices 168, such as smartphones, tablets, and the like, to devices in the home area network, processing and presenting data acquired in the HAN to end-users, linking devices in one or more HANs to user accounts of the cloud service 112, provisioning and updating devices in the HAN, and so forth. For example, a user can control the thermostat 132 and other wireless network devices in the home environment using a network-connected computer or portable device, such as a mobile phone or tablet device. Further, the wireless network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, and so on).

Any of the wireless network devices in the HAN can serve as low-power and communication nodes to create the HAN in the home environment. Individual low-power nodes of the network can regularly send out messages regarding what they are sensing, and the other low-powered nodes in the environment—in addition to sending out their own messages—can repeat the messages, thereby communicating the messages from node to node (e.g., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, the occupancy sensor 150 and/or an ambient light sensor 170 can detect an occupant in a room as well as measure the ambient light, and activate the light source when the ambient light sensor 170 detects that the room is dark and when the occupancy sensor 150 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (e.g., network-connected device to network-connected device) within the home environment as well as over the Internet to a central server or cloud-computing system.

In other configurations, various ones of the wireless network devices can function as "tripwires" for an alarm system in the home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 138 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 138 that lead to a safe exit. The light units 138 may also be turned on to indicate the direction along an exit route that a person should travel to safely exit the structure.

The various wireless network devices may also be implemented to integrate and communicate with wearable computing devices 172, such as may be used to identify and locate an occupant of the structure and adjust the temperature, lighting, sound system, and the like accordingly. In other implementations, radio frequency identification (RFID) sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques may draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 140 may also include a network-connected alarm clock 174 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 132 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 132 so as to pre-heat or cool the environment to a desired setting and turning on or turning off the lighting units 138.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 130 may include one or more wireless network devices that function as a hub 176. The hub 176 (e.g., hub 120) may be a general-purpose home automation hub, or an application-specific hub, such as a security hub, an energy management hub, an HVAC hub, and so forth. The functionality of a hub 176 may also be integrated into any wireless network device, such as a network-connected thermostat device or the border router 106. Hosting functionality on the hub 176 in the structure 142 can improve reliability when the user's internet connection is unreliable, can reduce latency of operations that would normally have to connect to the cloud service 112, and can satisfy system and regulatory constraints around local access between wireless network devices.

Additionally, the example environment 130 includes a network-connected speaker 178. The network-connected speaker 178 provides voice assistant services that include providing voice control of network-connected devices. The functions of the hub 176 may be hosted in the network-connected speaker 178. The network-connected speaker 178 can be configured to communicate via the HAN, which may include a wireless mesh network, a Wi-Fi network, or both.

Figure 2A:
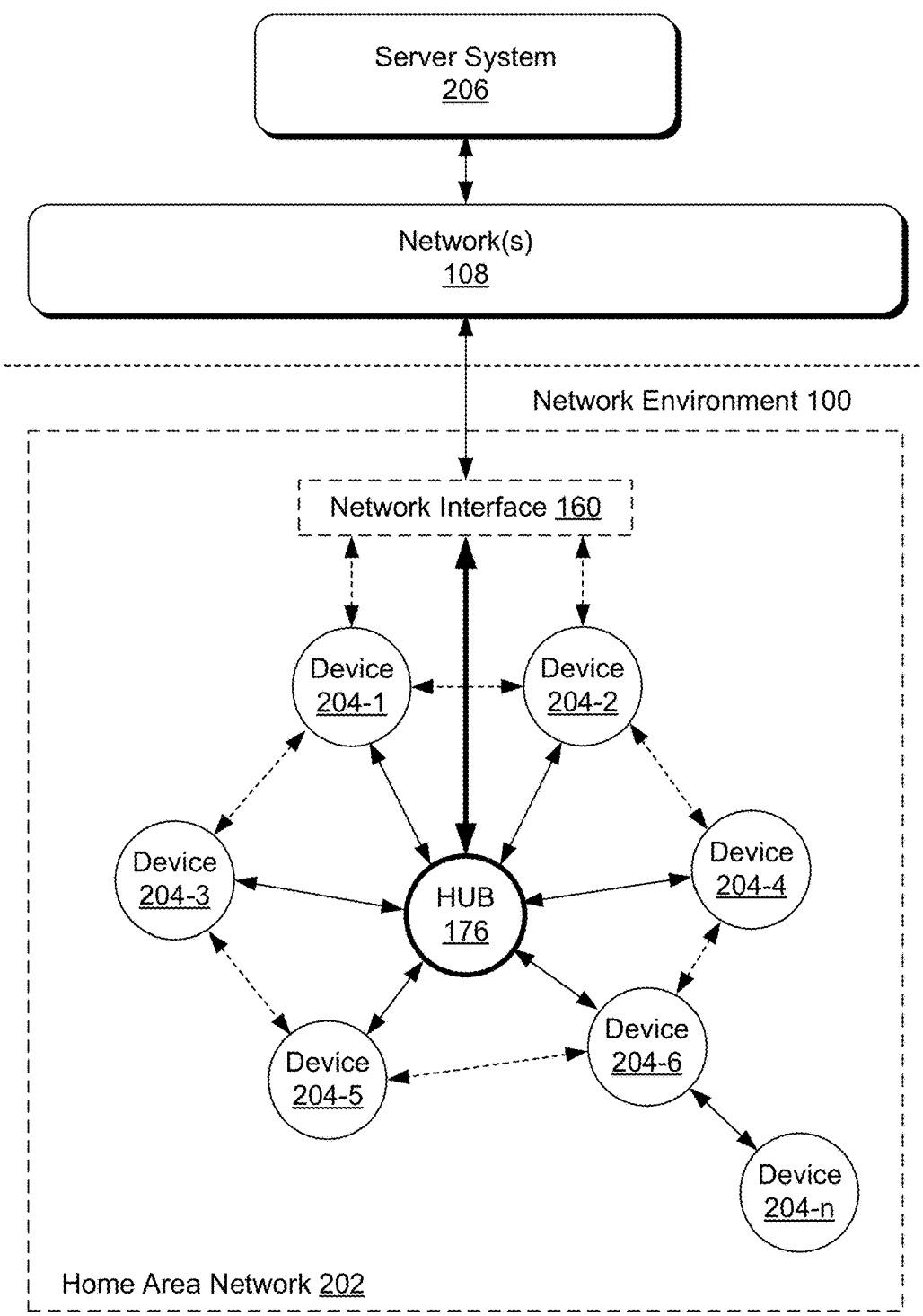
FIG. 2A illustrates an example home area network system in which various aspects of a video-recording doorbell can be implemented.

FIG. 2A is a block diagram illustrating a representative network architecture 200 that includes a home area network 202 (HAN 202) in accordance with some implementations. In some implementations, smart devices 204 (e.g., wireless network devices 102) in the network environment 100 combine with the hub 176 to create a mesh network in the HAN 202. In some implementations, one or more of the smart devices 204 in the HAN 202 operate as a smart home controller. Additionally and/or alternatively, the hub 176 may operate as the smart home controller. In some implementations, a smart home controller has more computing power than other smart devices. The smart home controller can process inputs (e.g., from smart devices 204, end user devices 168, and/or server system 206) and send commands (e.g., to smart devices 204 in the HAN 202) to control operation of the network environment 100. In aspects, some of the smart devices 204 in the HAN 202 (e.g., in the mesh network) are "spokesman" nodes (e.g., 204 1, 204-2) and others are "low-powered" nodes (e.g., 204-n). Some of the smart devices in the network environment 100 may be battery powered, while others may have a regular and reliable power source, such as via line power (e.g., to 120V line voltage wires). The smart devices that have a regular and reliable power source are referred to as "spokesman" nodes. These nodes are typically equipped with the capability of using a wireless protocol to facilitate bidirectional communication with a variety of other devices in the network environment 100, as well as with the server system 206 (e.g., cloud service 112, partner cloud service 122). In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

Some low-power nodes may be incapable of bidirectional communication. These low-power nodes send messages but are unable to "listen". Thus, other devices in the network environment 100, such as the spokesman nodes, cannot send information to these low-power nodes.

Some low-power nodes may be capable of only a limited bidirectional communication. As a result of such limited bidirectional communication, other devices may be able to communicate with these low-power nodes only during a certain time period.

As described, in some implementations, the smart devices serve as low-power and spokesman nodes to create a mesh network in the network environment 100. In some implementations, individual low-power nodes in the network environment regularly send out messages regarding what they are sensing, and the other low-powered nodes in the network environment—in addition to sending out their own messages—forward the messages, thereby causing the messages to travel from node to node (e.g., device to device)

throughout the HAN 202. In some implementations, the spokesman nodes in the HAN 202, which are able to communicate using a relatively high-power communication protocol (e.g., IEEE 802.11), are able to switch to a relatively low-power communication protocol (e.g., IEEE 802.15.4) to receive these messages, translate the messages to other communication protocols, and send the translated messages to other spokesman nodes and/or the server system 206 (using, e.g., the relatively high-power communication protocol). Thus, the low-powered nodes using low-power communication protocols are able to send and/or receive messages across the entire HAN 202, as well as over the Internet (e.g., network 108) to the server system 206. In some implementations, the mesh network enables the server system 206 to regularly receive data from most or all of the smart devices in the home, make inferences based on the data, facilitate state synchronization across devices within and outside of the HAN 202, and send commands to one or more of the smart devices to perform tasks in the network environment.

As described, the spokesman nodes and some of the low-powered nodes are capable of "listening." Accordingly, users, other devices, and/or the server system 206 may communicate control commands to the low-powered nodes. For example, a user may use the end user device 168 (e.g., a smart phone) to send commands over the Internet to the server system 206, which then relays the commands to one or more spokesman nodes in the HAN 202. The spokesman nodes may use a low-power protocol to communicate the commands to the low-power nodes throughout the HAN 202, as well as to other spokesman nodes that did not receive the commands directly from the server system 206.

In some implementations, a lighting unit 138 (FIG. 1B), which is an example of a smart device 204, may be a low-power node. In addition to housing a light source, the lighting unit 138 may house an occupancy sensor (e.g., occupancy sensor 150), such as an ultrasonic or passive IR sensor, and an ambient light sensor (e.g., ambient light sensor 170), such as a photo resistor or a single-pixel sensor that measures light in the room. In some implementations, the lighting unit 138 is configured to activate the light source when its ambient light sensor detects that the room is dark and when its occupancy sensor detects that someone is in the room. In other implementations, the lighting unit 138 is simply configured to activate the light source when its ambient light sensor detects that the room is dark. Further, in some implementations, the lighting unit 138 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (e.g., smart device to smart device) within the HAN 202 as well as over the Internet (e.g., network 108) to the server system 206.

Other examples of low-power nodes include battery-operated versions of the hazard detectors 134. These hazard detectors 134 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, hazard detectors 134 may send messages that correspond to each of the respective sensors to the other devices and/or the server system 206, such as by using the mesh network as described above.

Examples of spokesman nodes include entryway interface devices 146 (e.g., smart doorbells), thermostats 132, control panels 166, electrical outlets or devices 154, and other wireless network devices 140. These devices are often located near and connected to a reliable power source, and therefore may include more power-consuming components, such as one or more communication chips capable of bidirectional communication in a variety of protocols.

In some implementations, the network environment 100 includes controlled systems 156, such as service robots, that are configured to carry out, in an autonomous manner, any of a variety of household tasks.

As explained with reference to FIG. 1B, in some implementations, the network environment 100 includes a hub device (e.g., hub 176) that is communicatively coupled to the network(s) 108 directly or via a network interface 208 (e.g., access point 110). The hub 176 is further communicatively coupled to one or more of the smart devices 204 using a radio communication network that is available at least in the network environment 100. Communication protocols used by the radio communication network include, but are not limited to, ZigBee, Z Wave, Insteon, EuOcean, Thread, OSIAN, Bluetooth Low Energy and the like. In some implementations, the hub 176 not only converts the data received from each smart device to meet the data format requirements of the network interface 208 or the network(s) 108, but also converts information received from the network interface 208 or the network(s) 108 to meet the data format requirements of the respective communication protocol associated with a targeted smart device. In some implementations, in addition to data format conversion, the hub 176 further processes the data received from the smart devices or information received from the network interface 208 or the network(s) 108 preliminary. For example, the hub 176 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 208 and the hub 176 are integrated to one network device. Functionality described herein is representative of particular implementations of smart devices, control application(s) running on representative electronic device(s) (such as a smart phone), hub(s) 176, and server system(s) 206 coupled to hub(s) 176 via the Internet or other Wide Area Network. All or a portion of this functionality and associated operations can be performed by any elements of the described system—for example, all or a portion of the functionality described herein as being performed by an implementation of the hub can be performed, in different system implementations, in whole or in part on the server, one or more connected smart devices and/or the control application, or different combinations thereof.

Figure 2B:
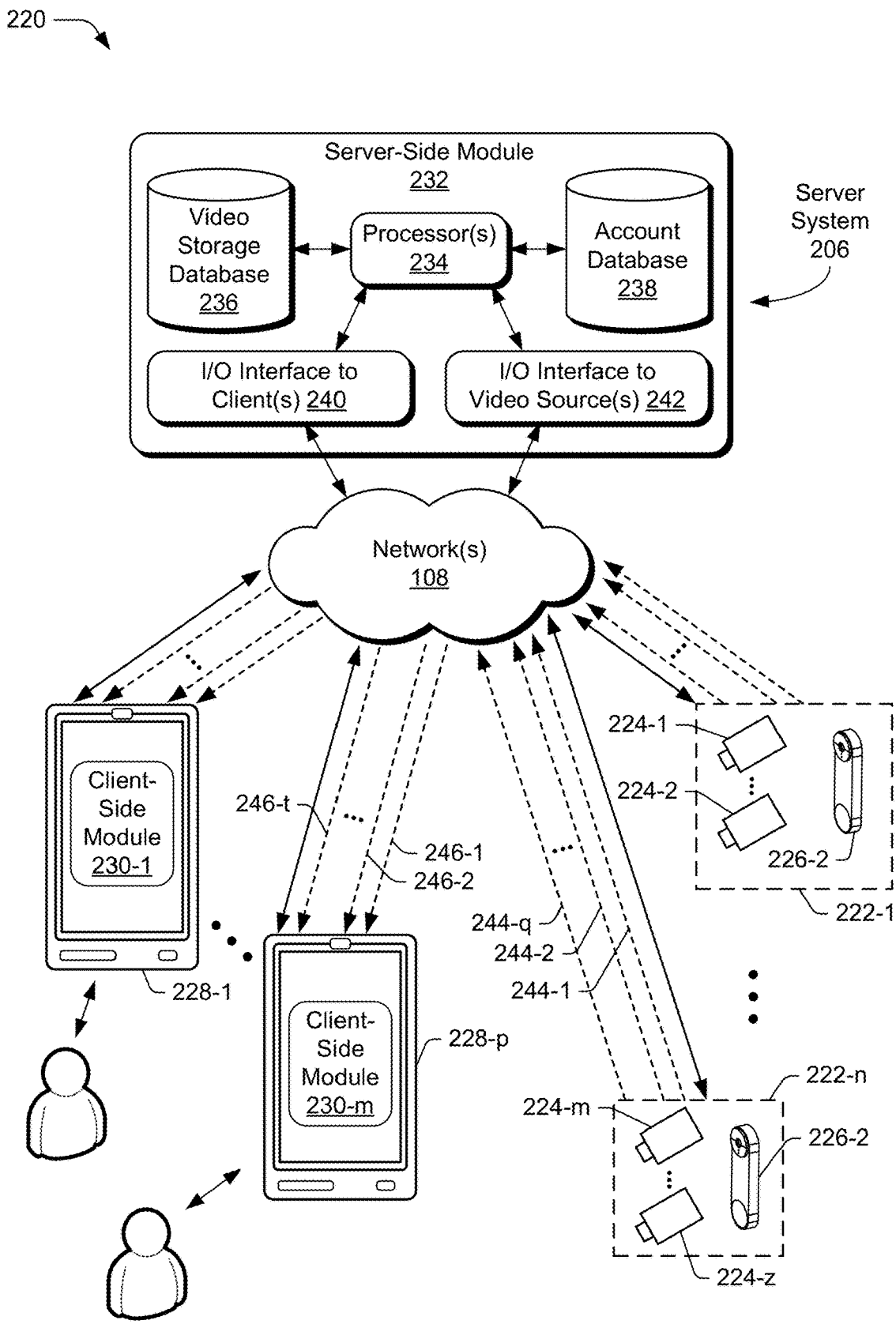
FIG. 2B illustrates an example operating environment in which a server system interacts with client devices and smart devices in accordance with some implementations.

FIG. 2B illustrates a representative operating environment 220 in which a server system 206 provides data processing for monitoring and facilitating review of events (e.g., motion, audio, security, etc.) in video streams captured by cameras 136 (e.g., video cameras, doorbell cameras). As shown in FIG. 2B, the server system 206 receives video data from video sources 222 (including video cameras 224 or video-recording doorbells 226) located at various physical locations (e.g., inside or in proximity to homes, restaurants, stores, streets, parking lots, and/or the network environments 100 of FIG. 1A). Each video source 222 may be linked to one or more reviewer accounts, and the server system 206 provides video monitoring data for the video source 222 to client devices 228 associated with the reviewer accounts. For example, the portable end user device 168 is an example of the client device 228. In some implementations, the server system 206 is a video processing server that provides video processing services to the video sources and client devices 228.

In some implementations, the server system 206 receives non-video data from one or more smart devices 204 (e.g., audio data, metadata, numerical data, etc.). The non-video data may be analyzed to provide context for motion events detected by the video cameras 224 and/or the video-recording doorbells 226. In some implementations, the non-video data indicates that an audio event (e.g., detected by an audio device such as an audio sensor integrated in the network-connected speaker 178), a security event (e.g., detected by a perimeter monitoring device such as the camera 136 and/or a motion sensor), a hazard event (e.g., detected by the hazard detector 134), medical event (e.g., detected by a health-monitoring device), or the like has occurred within a network environment 100.

In some implementations, multiple reviewer accounts are linked to a single network environment 100. For example, multiple occupants of a network environment 100 may have accounts liked to the network environment 100. In some implementations, each reviewer account is associated with a particular level of access. In some implementations, each reviewer account has personalized notification settings. In some implementations, a single reviewer account is linked to multiple network environments 100 (e.g., multiple different HANs). For example, a person may own or occupy, or be assigned to review and/or govern, multiple network environments 100. In some implementations, the reviewer account has distinct levels of access and/or notification settings for each network environment.

In some implementations, each of the video sources 222 includes one or more video cameras 224 or video-recording doorbells 226 that capture video and send the captured video to the server system 206 substantially in real-time. In some implementations, each of the video sources 222 includes one or more doorbells 226 that capture video and send the captured video to the server system 206 in real-time (e.g., within 1 second, 10 seconds, 30 seconds, or 1 minute). Each of the doorbells 226 may include a video camera that captures video and sends the captured video to the server system 206 in real-time. In aspects, a video source 222 includes a controller device (not shown) that serves as an intermediary between the one or more doorbells 226 and the server system 206. The controller device receives the video data from the one or more doorbells 226, optionally performs some preliminary processing on the video data, and sends the video data and/or the results of the preliminary processing to the server system 206 on behalf of the one or more doorbells 226 (e.g., in real-time). In some implementations, each camera has its own on-board processing capabilities to perform some preliminary processing on the captured video data before sending the video data (e.g., along with metadata obtained through the preliminary processing) to the controller device and/or the server system 206. In some implementations, one or more of the cameras is configured to, optionally, locally store the video data (e.g., for later transmission if requested by a user). In some implementations, a camera is configured to perform some processing of the captured video data and, based on the processing, either send the video data in substantially real-time, store the video data locally, or disregard the video data.

In accordance with some implementations, a client device 228 includes a client-side module 230. In some implementations, the client-side module communicates with a server-side module 232 executed on the server system 206 through the one or more networks 108. The client-side module provides client-side functionality for the event monitoring and review processing and communications with the server-side module. The server-side module provides server-side functionality for event monitoring and review processing for any number of client-side modules each residing on a respective client device 228 (e.g., any one of client devices 228-1 to 228-$m$). In some implementations, the server-side module 232 also provides server-side functionality for video processing and camera control for any number of the video sources 222, including any number of control devices, cameras 136, and doorbells 226.

In some implementations, the server system 206 includes one or more processors 234, a video storage database 236, an account database 238, an input/output (I/O) interface 240 to one or more client devices 228, and an I/O interface 242 to one or more video sources 222. The I/O interface 242 to one or more client devices 228 facilitates the client-facing input and output processing. The account database 238 stores a plurality of profiles for reviewer accounts registered with the video processing server, where a respective user profile includes account credentials for a respective reviewer account, and one or more video sources linked to the respective reviewer account. The I/O interface 242 to one or more video sources 222 facilitates communications with one or more video sources 222 (e.g., groups of one or more doorbells 226, cameras 136, and associated controller devices). The video storage database 236 stores raw video data received from the video sources 222, as well as various types of metadata, such as motion events, event categories, event categorization models, event filters, and event masks, for use in data processing for event monitoring and review for each reviewer account.

Examples of a representative client device 228 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an eBook reader, or a combination of any two or more of these data processing devices or other data processing devices.

Examples of the one or more networks 108 include local area networks (LAN) and wide area networks (WAN) such as the Internet. The one or more networks 108 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 206 is implemented on one or more standalone data processing apparatuses or a distributed network of computers. The server system 206 may also employ various virtual devices and/or services of third party service providers (e.g., third-party cloud service providers) to provide the underlying computing resources and/or infrastructure resources of the server system 206. In some implementations, the server system 206 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of operating environment can vary in different implementations. Similarly, the division of functionality between a video source 222 and the server system 206 can vary in different implementations. For example, in some implementations, the client-side module is a thin-client that provides only user-facing input and output processing functions, and delegates all other data processing functionality to a backend server (e.g., the server system 206). Similarly, in some implementations, a respective one of the video sources 222 is a simple video capturing device that continuously captures and streams (e.g., continuous video recording (CVR)) video data to the server system 206 with limited or no local preliminary processing on the video data. In some implementations, a respective one of the video sources 222 is a smart video capturing device that captures and streams video data to the server system 206 in response to detection of an event (e.g., event-based recording (EBR)). Although many aspects of the present technology are described from the perspective of the server system 206, the corresponding actions performed by a client device 228 and/or the video sources 222 would be apparent to one of skill in the art. Similarly, some aspects of the present technology may be described from the perspective of a client device 228 or a video source 222, and the corresponding actions performed by the video server would be apparent to one of skill in the art. Furthermore, some aspects of the present technology may be performed by the server system 206, a client device 228, and a video source 222 cooperatively.

In some aspects, a video source 222 (e.g., a video camera 224 or a doorbell 226 having an image sensor) transmits one or more streams 244 of video data to the server system 206. In some implementations, the one or more streams include multiple streams, having respective resolutions and/or frame rates, of the raw video captured by the image sensor. In some implementations, the multiple streams include a "primary" stream (e.g., 244-1) with a certain resolution and frame rate, corresponding to the raw video captured by the image sensor, and one or more additional streams (e.g., 244-2 through 244-$q$). An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream. In some implementations, the primary stream and/or the additional streams are dynamically encoded (e.g., based on network conditions, server operating conditions, camera operating conditions, characterization of data in the stream (e.g., whether motion is present), user preferences, and the like.

In some implementations, one or more of the streams 244 is sent from the video source 222 directly to a client device 228 (e.g., without being routed to, or processed by, the server system 206). In some implementations, one or more of the streams is stored at a local memory of the doorbell 226 and/or at a local storage device (e.g., a dedicated recording device), such as a digital video recorder (DVR). For example, in accordance with some implementations, the doorbell 226 stores the most-recent 24 hours of video footage recorded by the camera. In some implementations, portions of the one or more streams are stored at the doorbell 226 and/or the local storage device (e.g., portions corresponding to particular events or times of interest).

In some implementations, the server system 206 transmits one or more streams 246 of video data to a client device 228 to facilitate event monitoring by a user. In some implementations, the one or more streams may include multiple streams, of respective resolutions and/or frame rates, of the same video feed. In some implementations, the multiple streams include a "primary" stream (e.g., 246-1) with a certain resolution and frame rate, corresponding to the video feed, and one or more additional streams (e.g., 246-2 through 246-$t$). An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream.

Figure 3:
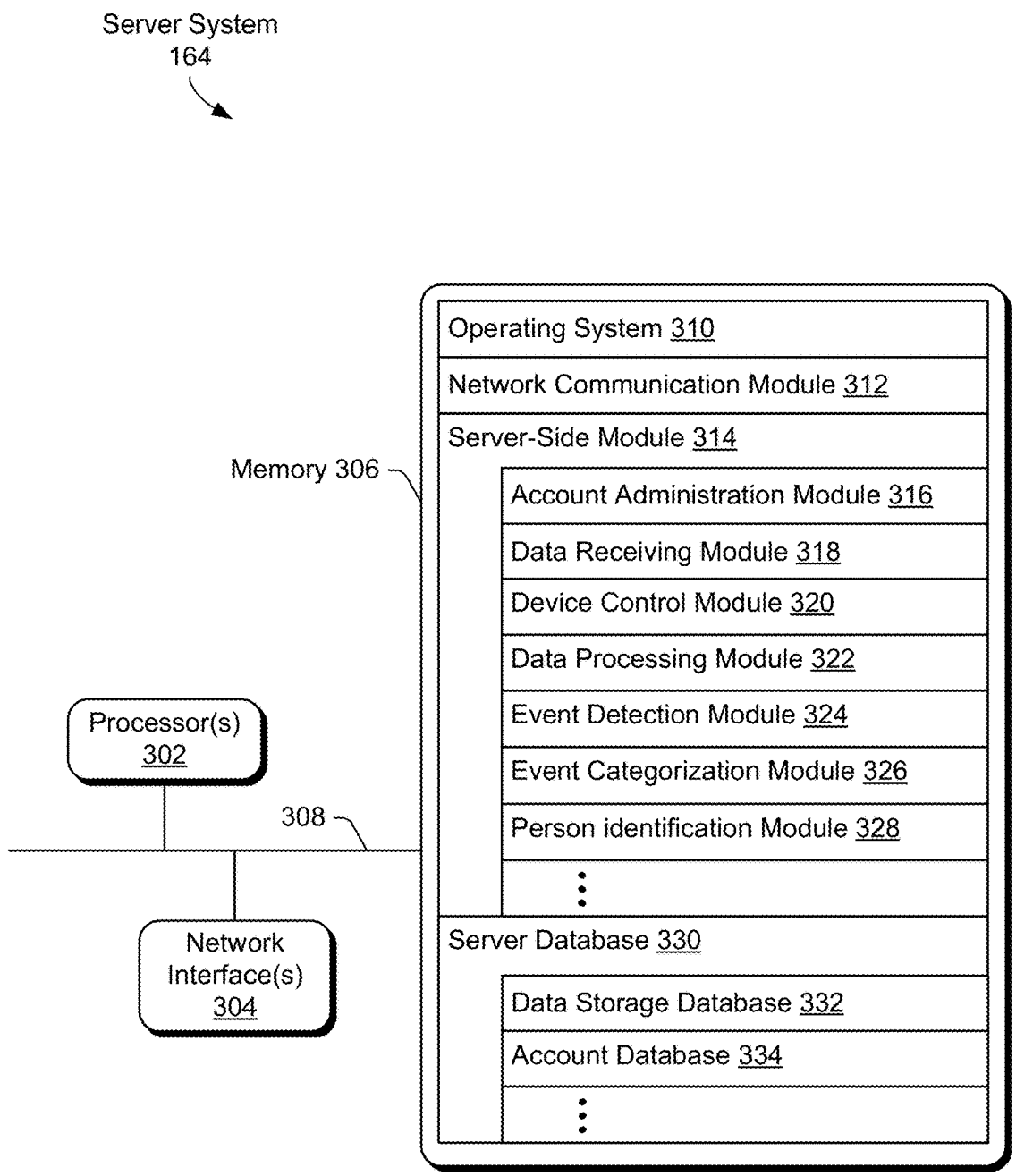
FIG. 3 is a block diagram illustrating an example video server system, in accordance with some implementations.

FIG. 3 is a block diagram illustrating the server system 206 in accordance with some implementations. The server system 206 typically includes one or more processors 302, one or more network interfaces 304 (e.g., including the I/O interface 240 to one or more client devices and the I/O interface 242 to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more the processors 302. The memory 306, or alternatively the non-volatile memory within memory 306, includes a non-transitory computer readable storage medium. In some implementations, the memory 306, or the non-transitory computer readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 206 to other systems and devices (e.g., client devices, electronic devices, and systems connected to one or more networks 108) via one or more network interfaces 304 (wired or wireless);
- a server-side module 314, which provides server-side functionalities for device control, data processing, and data review, including, but not limited to:
    - an account administration module 316 for creating reviewer accounts, performing camera registration processing to establish associations between video sources to their respective reviewer accounts, and providing account login-services to the client devices 228;
    - a data receiving module 316 for receiving data from electronic devices (e.g., video data from a video source 222 in FIG. 2B), and preparing the received data for further processing and storage in a data storage database (e.g., data storage database 332);

a device control module 320 for generating and sending server-initiated control commands to modify operation modes of electronic devices (e.g., devices of a network environment 100), and/or receiving (e.g., from client devices 228) and forwarding user-initiated control commands to modify operation modes of the electronic devices;

a data processing module 322 for processing the data provided by the electronic devices, and/or preparing and sending processed data to a device for review (e.g., client devices 228 for review by a user);

an event detection module 324 for detecting motion event candidates in video streams from each of the video sources 222, including motion track identification, false positive suppression, and event mask generation and caching;

an event categorization module 326 for categorizing motion events detected in received video streams; and a person identification module 328 for identifying characteristics associated with presence of humans in the received video streams; and a server database 330, which provides server-side storage data associated with device control, data processing, and data review, including but not limited to:

a data storage database 332 for storing data (e.g., raw/processed image data) associated with each electronic device (e.g., each video source 222) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub 176 or smart devices are stored securely; and an account database 334 for storing account information for user accounts, including user account information such as user profiles, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., a media access control (MAC) address and universally unique identifier (UUID)), device specific secrets, and displayed titles.

Each of the above identified elements may be stored in one or more of the previously mentioned memory devices and may correspond to a set of instructions for performing a function described above. The above identified modules or programs (e.g., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 4A:
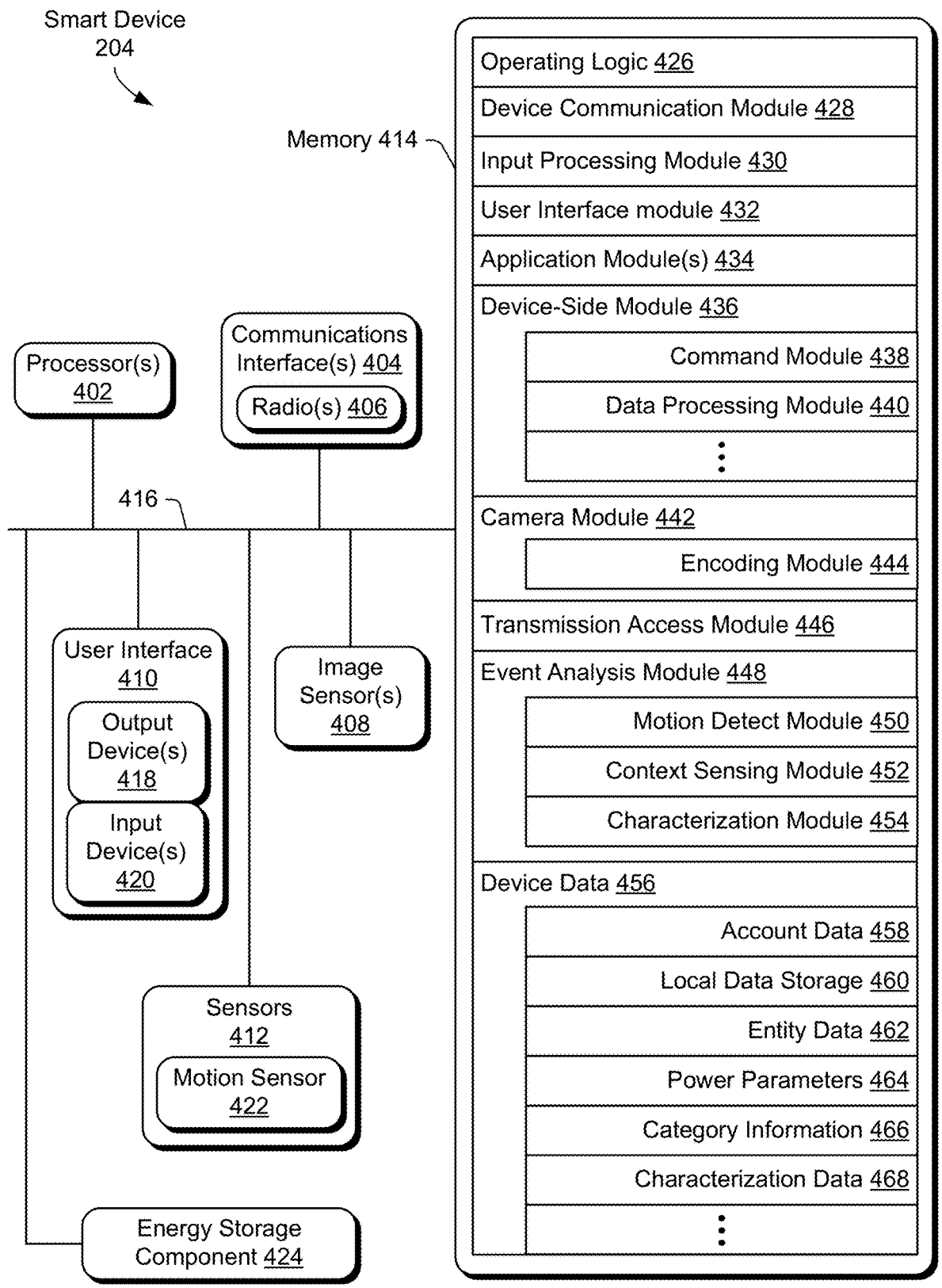
FIG. 4A is a block diagram illustrating an example client device, in accordance with some implementations.

FIG. 4A is a block diagram illustrating an example smart device 204 in accordance with some implementations. In some implementations, the smart device 204 (e.g., any device of the network environment 100 in FIG. 1A, including end user device 168) includes one or more processors 402 (e.g., CPUs, ASICs, FPGAs, microprocessors, and the like), one or more communication interfaces 404 with radios 406, image sensor (s) 408, user interfaces(s) 410, sensor(s) 412, memory 414, and one or more communication buses 416 for interconnecting these components (sometimes called a chipset). In some implementations, the user interface 410 includes one or more output devices 418 that enable presentation of media content, including one or more speakers and/or one or more visual displays. In some implementations, the user interface 410 includes one or more input devices 420, including user interface components that facilitate user input such as a keyboard, a mouse, a voice-command input unit or microphone, a touch screen display, a touch-sensitive input pad, a gesture capturing camera, or other input buttons or controls. In some implementations, an input device 420 for a doorbell 226 is a tactile or touch-sensitive doorbell button. Furthermore, some smart devices 204 use a microphone and voice recognition or a camera and gesture recognition to supplement or replace the keyboard.

The sensor(s) 422 include, for example, one or more thermal radiation sensors, ambient temperature sensors, humidity sensors, infrared (IR) sensors such as passive infrared (PIR) sensors, proximity sensors, range sensors, occupancy sensors (e.g., using RFID sensors), ambient light sensors (ALS), motion sensors 422, location sensors (e.g., global positioning satellite (GPS) sensors), accelerometers, and/or gyroscopes.

In some implementations, the smart device 204 includes an energy storage component 424 (e.g., one or more batteries and/or capacitors). In some implementations, the energy storage component 424 includes a power management integrated circuit (IC). In some implementations, the energy storage component 424 includes circuitry to harvest energy from signals received via an antenna (e.g., the radios 406) of the smart device. In some implementations, the energy storage component 424 includes circuitry to harvest thermal, vibrational, electromagnetic, and/or solar energy received by the smart device. In some implementations, the energy storage component 424 includes circuitry to monitor a stored energy level and adjust operation and/or generate notifications based on changes to the stored energy level.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. The radios 406 enable one or more radio communication networks in the network environments 100, and enable a smart device 204 to communicate with other devices. In some implementations, the radios 406 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.).

The memory 414 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 414, or alternatively the non-volatile memory within the memory 414, includes a non-transitory computer-readable storage medium. In some implementations, the memory 414, or the non-transitory computer-readable storage medium of the memory 414, stores the following programs, modules, and data structures, or a subset or superset thereof:

- operating logic 426 including procedures for handling various basic system services and for performing hardware dependent tasks;
- a communication module 428 for coupling to and communicating with other network devices (e.g., a network interface 208, such as a router that provides Internet connectivity, networked storage devices, network routing devices, a server system 206, other smart devices 204, client devices 228, etc.) connected to one or more networks 108 via one or more communication interfaces 404 (wired or wireless);
- an input processing module 430 for detecting one or more user inputs or interactions from the one or more input devices 420 and interpreting the detected inputs or interactions;
- a user interface module 432 for providing and presenting a user interface in which settings, captured data, and/or other data for one or more devices (e.g., the smart device 204, and/or other devices in a network environment 100) can be configured and/or viewed;
- one or more applications 434 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- a device-side module 436, which provides device-side functionalities for device control, data processing and data review, including but not limited to:
  - a command module 438 for receiving, forwarding, and/or executing instructions and control commands (e.g., from a client device 228, from a server system 206, from user inputs detected on the user interface 410, etc.) for operating the smart device 204; and
  - a data processing module 440 for processing data captured or received by one or more inputs (e.g., input devices 420, image sensor(s) 408, sensors 412, interfaces (e.g., communication interfaces 404, radios 406), and/or other components of the smart device 204, and for preparing and sending processed data to a remote device (e.g., client devices 228) for review by a user;
- a camera module 442 for operating the image sensor(s) 408 and associated circuitry, e.g., for enabling and disabling the image sensor(s) 408 based on data from one or more low-power sensors 412 (e.g., data from a PIR sensor or ALS), including an encoding module 444 for adjusting encoding of raw image data captured by the image sensor(s) 408 (e.g., adjusting format, resolution, and/or framerate);
- a transmission access module 446 for granting or denying transmission access to one or more radio(s) 406 (e.g., based on detected control signals and transmission requests);
- an event analysis module 448 for analyzing captured sensor data, e.g., to detect and/or recognize approaching visitors and context information, including but not limited to:
  - a motion detect module 450 for detecting events in the network environment (e.g., motion events in the video data), such as an approaching guest; and
  - a context sensing module 452 for detecting context data regarding an approaching guest, e.g., based on behavioral characteristics, object recognition, facial recognition, voice recognition, timing information, and user data associated with a user profile of the user (e.g., occupant);
  - a characterization module 454 for characterizing entities, persons (e.g., the approaching guest), and/or events detected by, or associated with, the smart device 204,
- device data 456 storing data associated with devices (e.g., the smart device 204), including, but not limited to:
  - account data 458 storing information related to user accounts linked to the smart device 204, e.g., including cached login credentials, smart device identifiers (e.g., MAC addresses and UUIDs), user interface settings, display preferences, authentication tokens and tags, password keys, and the like;
  - local data storage 460 for selectively storing raw or processed data associated with the smart device 204, such as event data and/or video data captured by the image sensor(s) 408;
  - entity data 462 storing information related to detected persons and other entities, such as characterization information (e.g., characterization data 468) and associated images;
  - power parameters 464 storing energy information, such as information related to the energy storage component 424 (e.g., estimated battery life), power settings of the smart device 204, a power state of the smart device 204, power preferences of user(s) of the smart device 204, and the like;
  - category information 466 detailing event categories for categorizing events detected by, or involving, the smart device (e.g., in conjunction with the event analysis module 448); and
  - characterization data 468 for entities, persons, and/or events detected by, or associated with, the smart device 204 (e.g., data generated or used by the characterization module 454).

Each of the above identified elements may be stored in one or more of the previously mentioned memory devices and corresponds to a set of instructions for performing a function described above. The above identified modules or programs (e.g., sets of instructions) need not be implemented as separate software programs, procedures, or modules, and thus various subsets of these modules may be combined or otherwise rearranged in various implementations. In some implementations, the memory 414, optionally, stores a subset of the modules and data structures identified above. Furthermore, the memory 414, optionally, stores additional modules and data structures not described above, such as a sensor management module for managing operation of the sensor(s) 412.

Figure 4B:
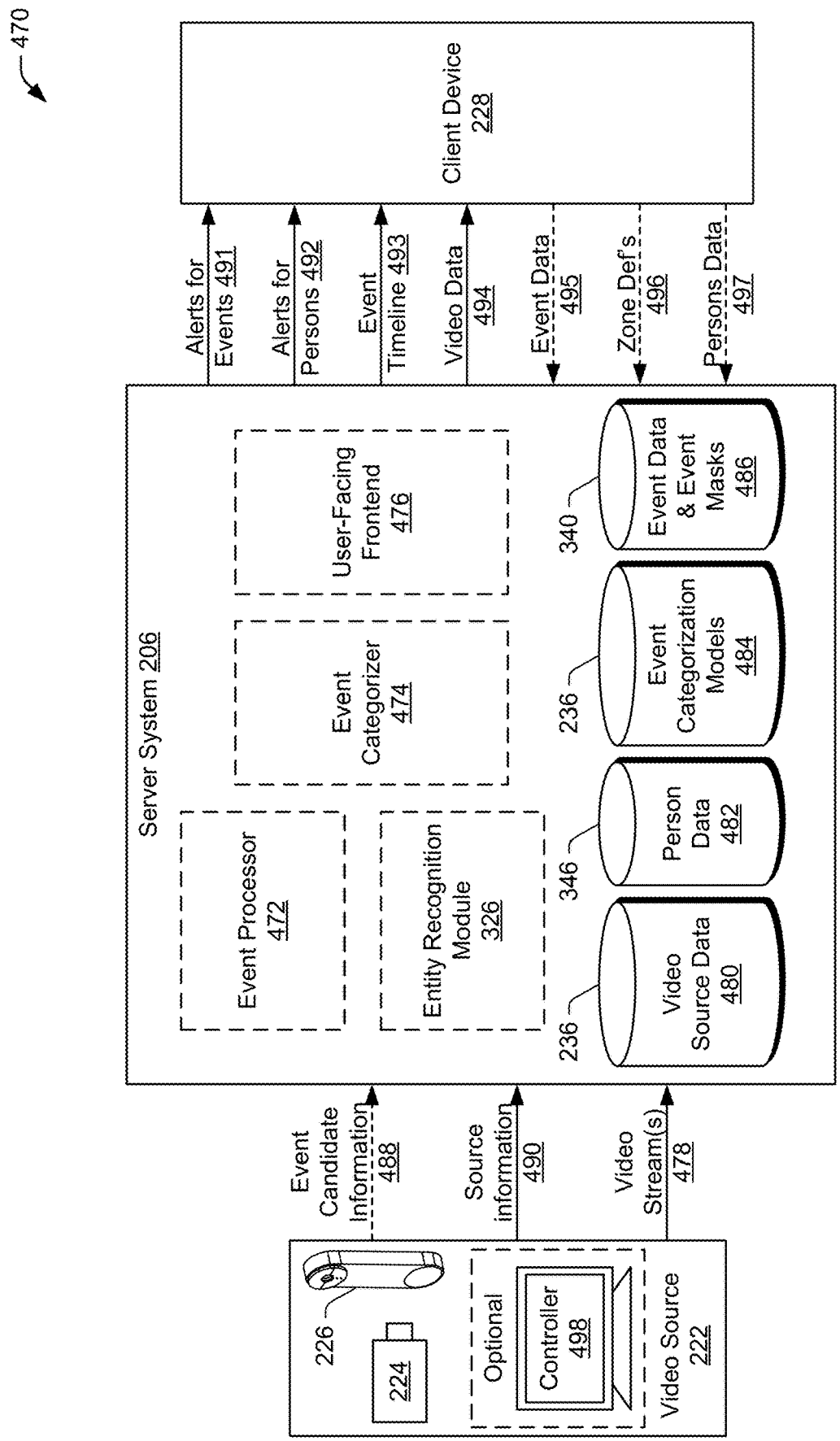
FIG. 4B illustrates a representative system architecture including video source(s), server system, and client device(s) in accordance with some implementations.

FIG. 4B illustrates a representative system architecture 470 including video source(s) 222, server system 206, and client device(s) 228 in accordance with some implementations. In some implementations, the server system 206 includes functional modules for an event processor 472, an event categorizer 474, an entity recognition module 326, and a user-facing frontend 476 (e.g., server-side module 314). The event processor 472 obtains the event candidates (e.g., by processing video stream(s) 478, by receiving event start information from the video source 222, or by detecting a user press on a doorbell button of a video-recording doorbell device 226). In some implementations, the event candidates comprise motion event candidates. In some implementations, the event candidates comprise audio event candidates. In some implementations, the event candidates include a user press on the doorbell button of the video-recording doorbell device 226. In some implementations, the event candidates include audio, electromagnetic, olfactory, and/or visual aspects. In some implementations, the event candidates include motion events, approach detections, and announcement detections. The event categorizer 474 categorizes the event candidates into different event categories (e.g., based on data from the event processor and/or the entity recognizer). The user-facing frontend 476 generates event alerts and notifications and facilitates review of the detected entities and events by a reviewer through a review interface on a client device 228. The user-facing frontend 476 also receives user edits on the event and entity categories, user preferences for alerts and event filters, zone definitions for zones of interest, and the like. The event categorizer 474 optionally revises event categorization models and results based on the user edits received by the user-facing frontend 476. The entity recognition module 326 optionally revises entity classifications and/or labels based on the user edits received by the user-facing frontend 476. The server system 206 also includes databases for storing video source data 480, person data 482, event categorization models 484, and event data and event masks 486. In implementations, the person data 482 is stored in a person database (e.g., the persons database 358). In some implementations, each of these databases is part of the server database 340 (e.g., part of data storage database 330).

The server system 206 receives one or more video stream(s) 478 from the video source 222 and optionally receives event candidate information 488, such as preliminary characterization information for detected entities and events (e.g., entity and event metadata from processing performed at the doorbell device 226), and source information 488 such as device settings for a doorbell device 226 (e.g., a device profile 350 for doorbell device 226). In some implementations, the event processor 472 communicates with the video source 222 and/or one or more other devices of the network environment, e.g., to request additional image data, audio data, and sensor data, such as high-definition images or metadata for the video stream(s) 478. The server system sends alerts for events 491, alerts for detected persons 492, event timeline information 493, and/or video data 494 (e.g., still images or video clips corresponding to the detected persons and/or events) to the client device 228. In some implementations, the alerts distinguish guest approach events from other types of motion events. In some implementations, the alerts distinguish motion events captured at a doorbell device 226 from motion events captured by other smart devices (e.g., cameras 136). The server system 206 optionally receives user information from the client device 228, such as event data 495 (e.g., edits to event categories), and zone definitions 496, and persons data 497 (e.g., classification of detected persons).

A data processing pipeline processes video information (e.g., a live video feed) received from a video source 222 (e.g., including a doorbell device 226 and an optional controller device) and/or audio information received from one or more smart devices in real-time (e.g., within 10 seconds, 30 seconds, or 2 minutes) to identify and categorize events occurring in the network environment, and sends real-time event alerts (e.g., within 10 seconds, 20 seconds, or 30 seconds) and/or a refreshed event timeline (e.g., within 30 seconds, 1 minute, or 3 minutes) to a client device 228 associated with a reviewer account for the network environment. The data processing pipeline also processes stored information (such as stored video feeds from a video source 222) to reevaluate and/or re-categorize events as necessary, such as when new information is obtained regarding the event and/or when new information is obtained regarding event categories (e.g., a new activity zone definition is obtained from the user).

After video and/or audio data is captured at a smart device, the data is processed to determine if any potential event candidates or persons are present. In some implementations, the data is initially processed at the smart device (e.g., video source 222, camera 136, or doorbell device 226). Thus, in some implementations, the smart device sends event candidate information 488, such as event start information, to the server system 206. In some implementations, the data is processed at the server system 206 for event start detection. In some implementations, the video and/or audio data is stored at server system 206 (e.g., in the video storage database 236). In some implementations, the visual/audio data is stored at a server distinct from the server system 206. In some implementations, after a motion start is detected, the relevant portion of the video stream is retrieved from storage (e.g., from the video storage database 236).

In some implementations, the event identification process includes segmenting the video stream into multiple segments then categorizing the event candidate within each segment. In some implementations, categorizing the event candidate includes an aggregation of background factors, entity detection and identification, motion vector generation for each motion entity, entity features, and scene features to generate motion features for the event candidate. In some implementations, the event identification process further includes categorizing each segment, generating or updating an event log based on categorization of a segment, generating an alert for the event based on categorization of a segment, categorizing the complete event, updating the event log based on the complete event, and generating an alert for the event based on the complete event. In some implementations, a categorization is based on a determination that the event occurred within a particular zone of interest. In some implementations, a categorization is based on a determination that the event candidate involves one or more zones of interest. In some implementations, a categorization is based on audio data and/or audio event characterization.

The event analysis and categorization process may be performed by the smart device (e.g., the video source 222) and the server system 206 cooperatively, and the division of the tasks may vary in different implementations, for different equipment capability configurations, power parameters, and/or for different network, device, and server load situations. After the server system 206 categorizes the event candidate, the result of the event detection and categorization may be sent to a reviewer associated with the network environment.

In some implementations, the server system 206 stores raw or compressed video source data 480 (e.g., in the video storage database 236), event categorization models 484 (e.g., in the categorization model database 360), and event masks and other event metadata (e.g., in the event information database 352) for each of the video sources 222. In some implementations, the video data is stored at one or more display resolutions such as 480 p, 780 p, 1080 i, 1080 p, and the like.

In some implementations, the video source 222 (e.g., the doorbell device 226) transmits a live video feed to the remote server system 206 via one or more networks (e.g., the network(s) 108). In some implementations, the transmission of the video data is continuous as the video data is captured by the doorbell device 226. In some implementations, the transmission of video data is irrespective of the content of the video data, and the video data is uploaded from the video source 222 to the server system 206 for storage irrespective of whether any motion event has been captured in the video data. In some implementations, the video data is stored at a local storage device of the video source 222 by default, and only video portions corresponding to motion event candidates detected in the video stream are uploaded to the server system 206 (e.g., in real-time or as requested by a user).

In some implementations, the video source 222 dynamically determines at what display resolution the video stream is to be uploaded to the server system 206. In some implementations, the video source 222 dynamically determines which parts of the video stream are to be uploaded to the server system 206. For example, in some implementations, depending on the current server load and network conditions, the video source 222 optionally prioritizes the uploading of video portions corresponding to newly detected motion event candidates ahead of other portions of the video stream that do not contain any motion event candidates; or the video source 222 uploads the video portions corresponding to newly detected motion event candidates at higher display resolutions than the other portions of the video stream. This upload prioritization helps to ensure that motion events of interest are detected and alerted to the reviewer in real-time, even when the network conditions and server load are less than optimal. In some implementations, the video source 222 implements two parallel upload connections, one for uploading the continuous video stream captured by the doorbell device 226, and the other for uploading video portions corresponding to detected motion event candidates. At any given time, the video source 222 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 4B, the video source 222 optionally includes a video doorbell device 226 and an optional controller device 498. In some implementations, the doorbell device 226 includes sufficient on-board processing power to perform all necessary local video processing tasks (e.g., cuepoint detection for motion event candidates, video uploading prioritization, network connection management, etc.), and the doorbell device 226 communicates with the server system 206 directly, without any controller device acting as an intermediary. In some implementations, the doorbell device 226 captures the video data and sends the video data to the controller device for the necessary local video processing tasks. The controller device 498 optionally performs the local processing tasks for multiple cameras. For example, there may be multiple cameras in one network environment (e.g., the network environment 100, FIG. 1A), and a single controller device 498 receives the video data from each camera and processes the video data to detect motion event candidates in the video stream from each camera. The controller device 498 is responsible for allocating sufficient outgoing network bandwidth to transmitting video segments containing motion event candidates from each camera to the server before using the remaining bandwidth to transmit the video stream from each camera to the server system 206. In some implementations, the continuous video stream is sent and stored at one server facility while the video segments containing motion event candidates are sent to and processed at a different server facility.

In some implementations, the smart device sends additional source information 490 to the server system 206. This additional source information 490 may include information regarding a device state (e.g., IR mode, auto exposure (AE) mode) and/or information regarding the environment in which the device is located (e.g., indoors, outdoors, nighttime, day-time, etc.). In some implementations, the source information 490 is used by the server system 206 to perform event detection, entity recognition, and/or to categorize event candidates. In some implementations, the additional source information 490 includes one or more preliminary results from video processing performed by the video source 222 (e.g., a doorbell device 226), such as categorizations, object/entity recognitions, motion masks, and the like.

In some implementations, the video portion after an event start incident is detected is divided into multiple segments. In some implementations, the segmentation continues until event end information (sometimes also called an "end-of-event signal") is obtained. In some implementations, the segmentation occurs within the server system 206 (e.g., by the event processor 472). In some implementations, the segmentation comprises generating overlapping segments. For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real-time initial categorization and alerts based on processing the first segment. The initial categorization may then be revised based on processing of subsequent segments. In some implementations, a new segment is generated if the motion entity enters a new zone of interest.

In some implementations, after the event processor module obtains the video portion corresponding to an event candidate, the event processor 472 obtains background factors and performs motion entity detection identification, motion vector generation for each motion entity, and feature identification. Once the event processor 472 completes these tasks, the event categorizer 474 aggregates all of the information and generates a categorization for the motion event candidate. In some implementations, the event processor 472 and the event categorizer 474 are components of the video processing module 322. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for a motion event candidate is optionally based on zones of interest involved with the motion event candidate, background features, motion vectors, scene features, entity features, motion features, motion tracks, and the like.

In some implementations, the video source 222 has sufficient processing capabilities to perform, and does perform, entity detection, person recognition, background estimation, motion entity identification, the motion vector generation, and/or the feature identification.

Figure 5:
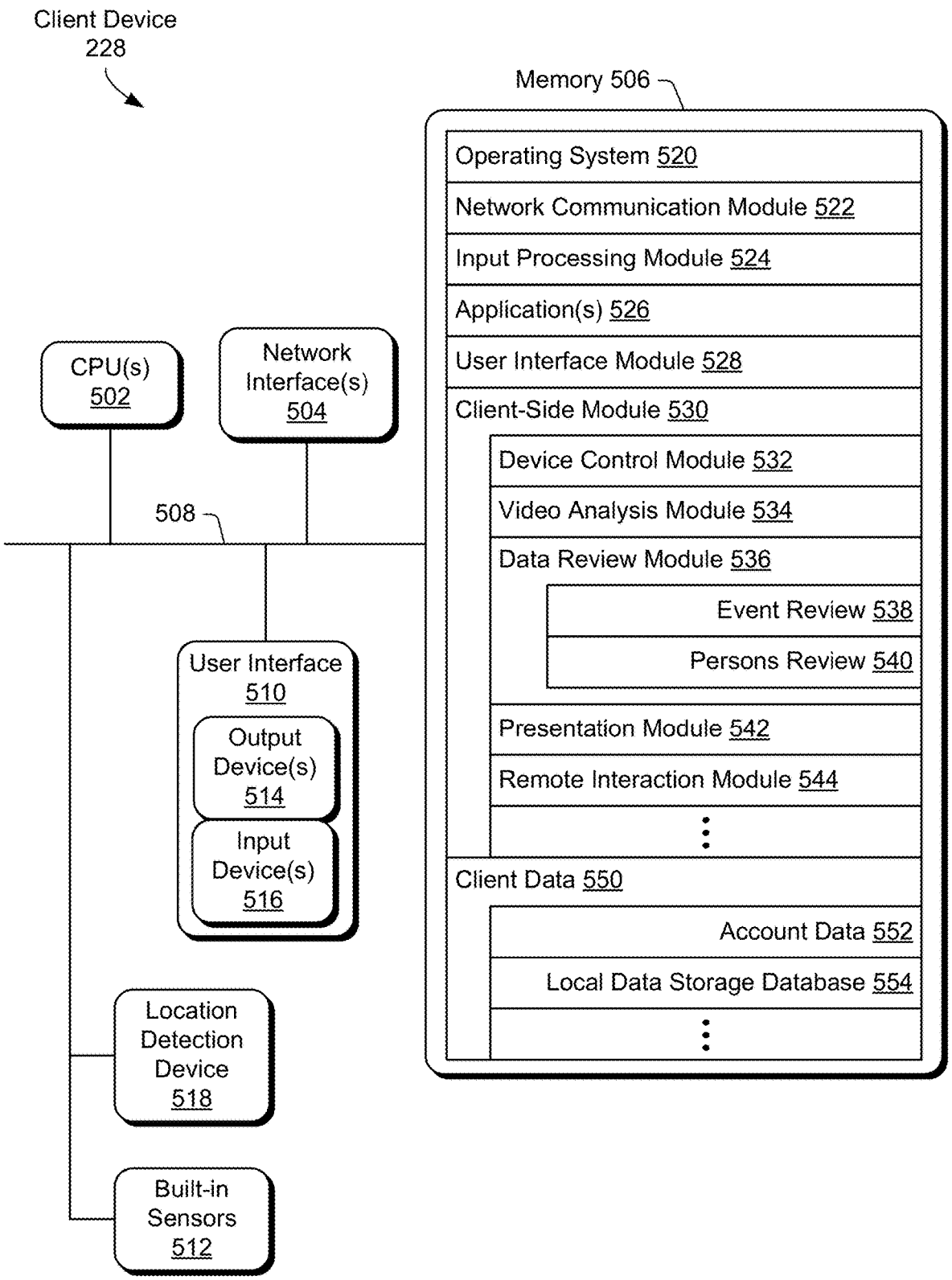
FIG. 5 is a block diagram illustrating a representative client device associated with a user account in accordance with some implementation.

FIG. 5 is a block diagram illustrating a representative client device 228 associated with a user account in accordance with some implementations. The client device 228, typically, includes one or more processing units (CPUs) 502, one or more network interfaces 504, memory 506, and one or more communication buses 508 for interconnecting these components (sometimes called a chipset). Optionally, the client device also includes a user interface 510 and one or more built-in sensors 512 (e.g., accelerometer and gyroscope). The user interface 510 includes one or more output devices 514 that enable presentation of media content, including one or more speakers and/or one or more visual displays. The user interface 510 also includes one or more input devices 516, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 518, such as a GPS sensor or other geo-location receiver, for determining the location of the client device.

The memory 506 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 506, optionally, includes one or more storage devices remotely located from one or more processing units 502. The memory 506, or alternatively the non-volatile memory within the memory 506, includes a non-transitory computer readable storage medium. In some implementations, the memory 506, or the non-transitory computer readable storage medium of the memory 506, stores the following programs, modules, and data structures, or a subset or superset thereof:
- an operating system 520 including procedures for handling various basic system services and for performing hardware dependent tasks;
- a network communication module 522 for connecting the client device 228 to other systems and devices (e.g., client devices, electronic devices, and systems connected to one or more networks 108) via one or more network interfaces 504 (wired or wireless);
- an input processing module 524 for detecting one or more user inputs or interactions from one of the one or more input devices 516 and interpreting the detected input or interaction;
- one or more applications 526 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- a user interface module 528 for providing and displaying a user interface in which settings, captured data, and/or other data for one or more devices (e.g., smart devices 204 in network environment 100) can be configured and/or viewed;
- a client-side module 530, which provides client-side functionalities for device control, data processing and data review, including but not limited to:
  - a device control module 532 for generating control commands for modifying an operating mode of smart devices (and optionally other electronic devices) in accordance with user inputs;
  - a video analysis module 534 for analyzing captured video data, e.g., to detect and/or recognize persons, objects, animals, and events;
  - a data review module 536 for providing user interfaces for reviewing data from the server system 206 or video sources 222, including but not limited to:
    - an event review module 538 for reviewing events (e.g., motion and/or audio events), and optionally enabling user edits and/or updates to the events; and
    - a person's review module 540 for reviewing data and/or images regarding detected persons and other entities, and optionally enabling user edits and/or updates to the persons data;
  - a presentation module 542 for presenting user interfaces and response options for interacting with the smart devices 204 and/or the server system 206; and
  - a remote interaction module 544 for interacting with a remote person (e.g., a visitor to the network environment 100), e.g., via a smart device 204 and/or the server system 206; and
- client data 546 storing data associated with the user account and electronic devices, including, but not limited to:
  - account data 548 storing information related to both user accounts loaded on the client device and electronic devices (e.g., of the video sources 222) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  - a local data storage database 550 for selectively storing raw or processed data associated with electronic devices (e.g., of the video sources 222, such as a doorbell 226), optionally including entity data described previously.

Each of the above identified elements may be stored in one or more of the previously mentioned memory devices and may correspond to a set of instructions for performing a function described above. The above identified modules or programs (e.g., sets of instructions) need not be implemented as separate software programs, procedures, modules or data structures, and thus various subsets of these modules may be combined or otherwise rearranged in various implementations. In some implementations, the memory 506, optionally, stores a subset of the modules and data structures identified above. Furthermore, the memory 506, optionally, stores additional modules and data structures not described above.

Example Implementations

Figure 6:
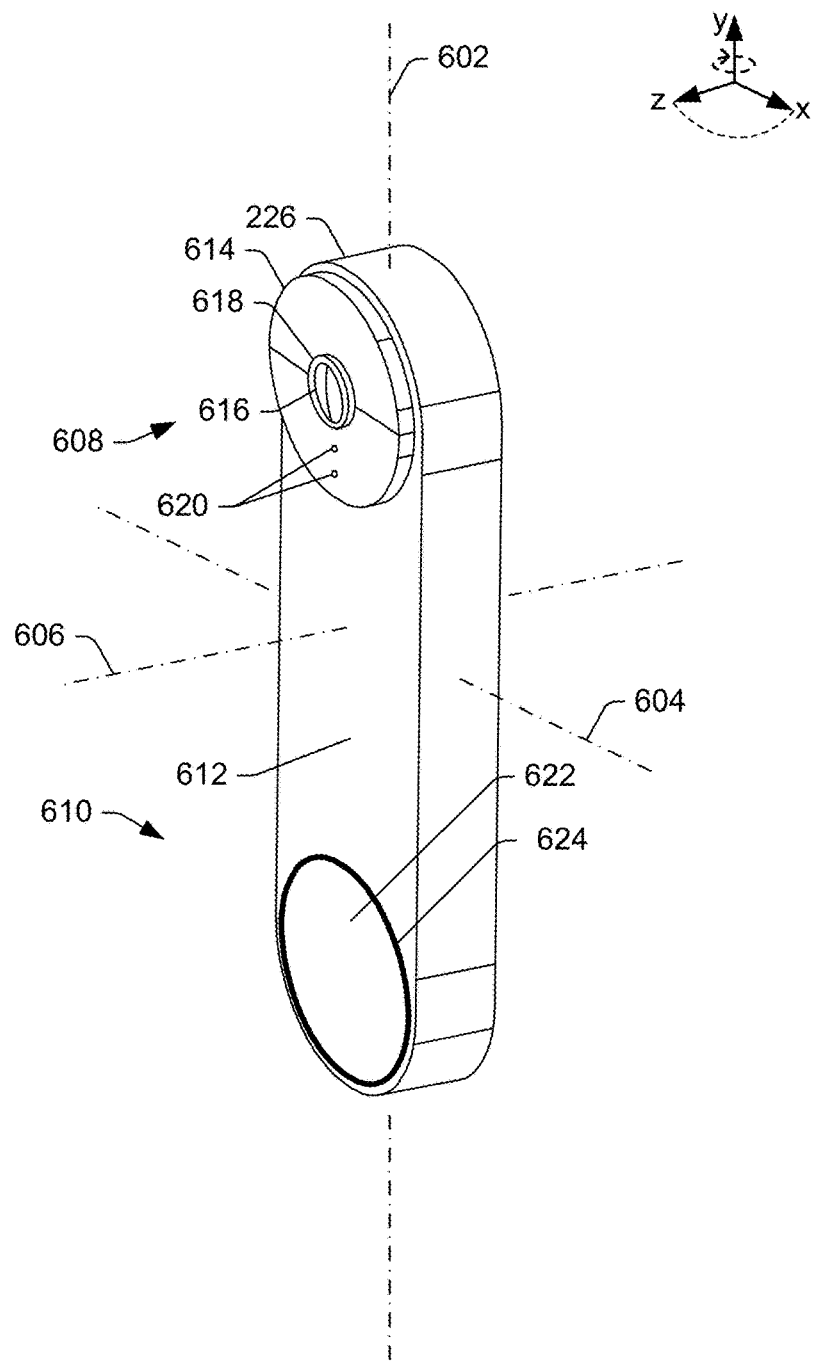
FIG. 6 illustrates an isometric view of an example video-recording doorbell, in accordance with some implementations.

FIG. 6 illustrates an isometric view 600 of an example video-recording doorbell (e.g., doorbell 226), in accordance with some implementations. The doorbell 226 is illustrated as having a longitudinal axis 602 (e.g., y-axis), a lateral axis 604 (e.g., x-axis), and a central axis 606 (e.g., z-axis). The doorbell 226 may be elongated along the longitudinal axis such that the doorbell 226 has a height along the longitudinal axis 602 that is significantly greater (at least by a magnitude of two) than a width along the lateral axis 604, and the width is greater than a depth along the central axis 606 (at least by a factor of 1.5). The doorbell 226 includes a camera-side end 608 and a button-side end 610, which are at opposing ends of a first surface (e.g., front exterior surface 612) of the housing. The camera-side end 608 of the doorbell 226 includes an IR cover 614, which includes a portion that is substantially transparent (e.g., 70%, 80%, 90%, 100% transparent) or translucent (e.g., between 31% and 69% transparent) to IR light and another portion that is substantially opaque (e.g., 70%, 80%, 90%, 100% opaque) to IR light.

In aspects, the IR cover extends outwardly from the front exterior surface 612 of the housing of the doorbell 226. The IR cover 614 forms an annular shape with a center aperture through which a camera lens 616 of the camera module (e.g., camera module 442 in FIG. 4A) extends. The annular shape is generally elliptical and, in some cases, where its major and minor axes are equal, the shape may be circular. A retainer 618 (e.g., lens retainer) surrounds the camera lens 616 in the xy plane and extends through the center aperture of the IR cover 614 to protrude from an outer surface of the IR cover 614. In an example, the retainer 618 has a substantially tubular shape (with an elliptical cross section, such as a circular cross section) and the camera lens 616 is positioned within a center area of the retainer 618. Both the retainer 618 and the camera lens 616 extend outwardly from the front exterior surface 612 of the housing, including extending outwardly from the outer surface of the IR cover 614. In some implementations, the camera lens 616 protrudes slightly (along the z-axis) from the end of the retainer 618. The retainer 618 reduces and/or prevents IR light from leaking into the camera lens 616 through the IR cover 614. The IR light may be provided by IR illuminators (e.g., IR LEDs) disposed behind the IR cover 614 and configured to direct the IR light through one or more apertures 620 in the IR cover 614. Also, the IR light may be received from the ambient environment, through the IR cover, and captured by a sensor (e.g., the image sensor, a passive infrared (PIR) sensor). Accordingly, the retainer 618 prevents the IR light from leaking into the sides or edges of the camera lens 616 from the IR cover 614.

The button-side end 610 of the doorbell 226 includes a button 622, which is pressable by a user to initiate a notification (e.g., chime). In aspects, the button 622 may be surrounded by a light ring 624, which may be substantially flush with the front exterior surface 612 of the doorbell 226. The button 622 and/or light ring 624 may have a shape and/or size that substantially matches the outline and/or size of the IR cover 614. In an example, the button 622 may have a diameter that is substantially equal to the outer diameter of the IR cover 614. In another example, the light ring 624 has an outer diameter that is substantially the same as the outer diameter of the IR cover 614.

Figure 7:
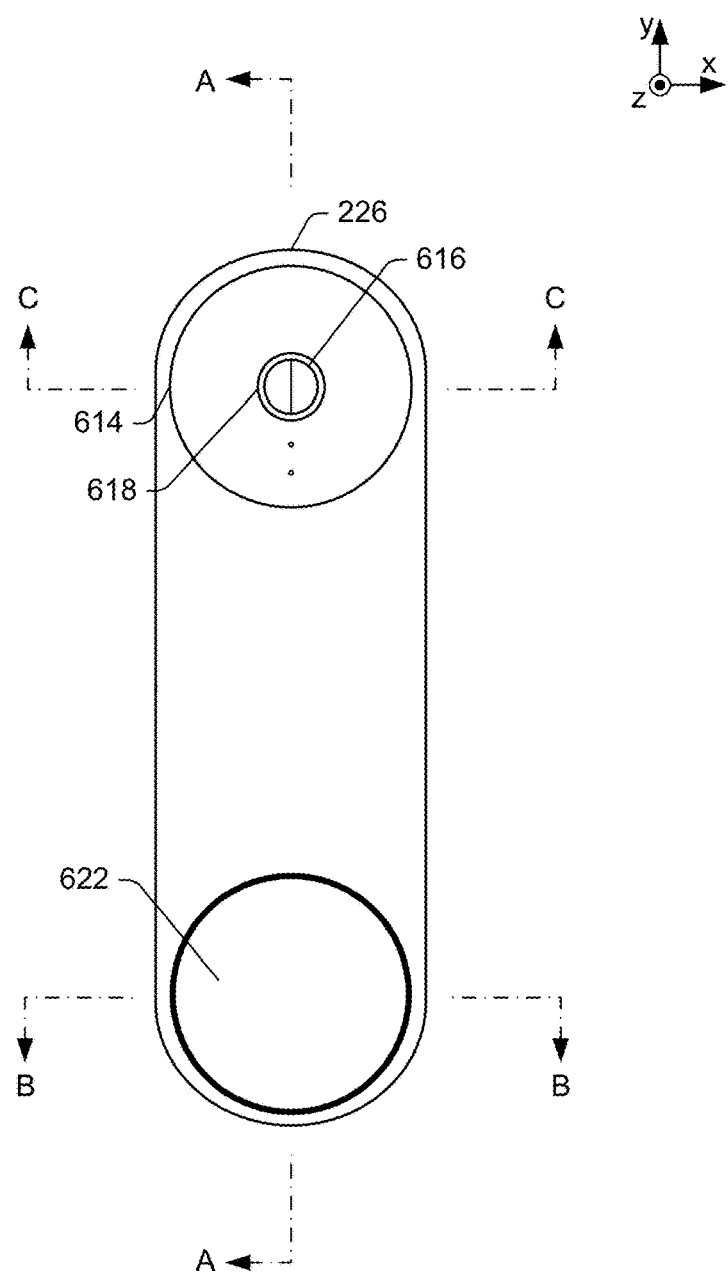
FIG. 7 illustrates a front elevational view of the example doorbell in FIG. 6.

FIG. 7 illustrates a front elevational view 700 of the example doorbell 226 in FIG. 6. As illustrated, the camera lens 616 of the camera module 442 (not shown in FIG. 7) is centered with respect to the IR cover 614 and encircled by the retainer 618. In the xy-plane (e.g., cross section of the retainer 618), the button 622 has an elliptical shape, in which its major axis and minor axis are different (e.g., forming an ellipse) or equal to one another (e.g., forming a circular shape). The IR cover 614 may have an elliptical shape similar to that of the button 622. Further, the doorbell 226 has an obround shape in the examples described herein. However, the doorbell 226 may have any suitable shape and is not limited to the exact shape described herein.

Figure 8:
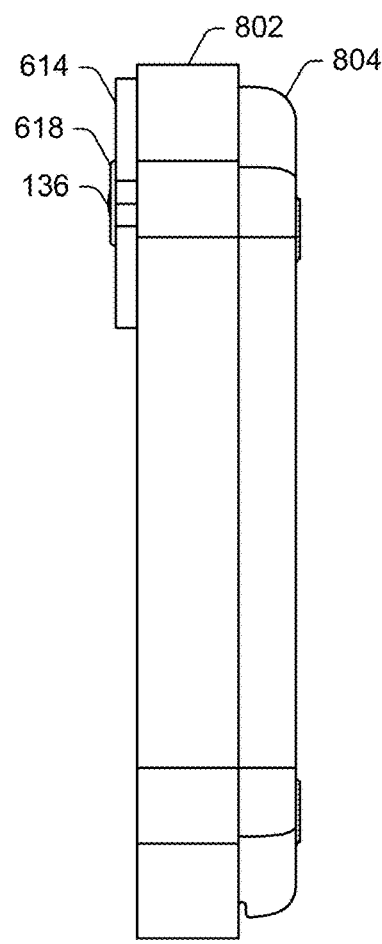
FIG. 8 illustrates a right elevational view of the example doorbell in FIG. 6, in accordance with some implementations.

FIG. 8 illustrates a right elevational view 800 of the example doorbell 226 in FIG. 6, in accordance with some implementations. As illustrated, the retainer 618 extends outwardly (in the z-direction) from the IR cover 614, which prevents IR light traveling through the IR cover 614 from leaking into the camera lens 616. The camera lens 616 may extend outwardly (in the z-direction) from the retainer 618 in order to maximize the field of view of the image sensor (e.g., image sensor 408 in FIG. 4A) via the camera lens 616. In aspects, the doorbell 226 includes a housing, which is formed by a front housing component 802 affixed to a rear housing component 804.

Figure 9:
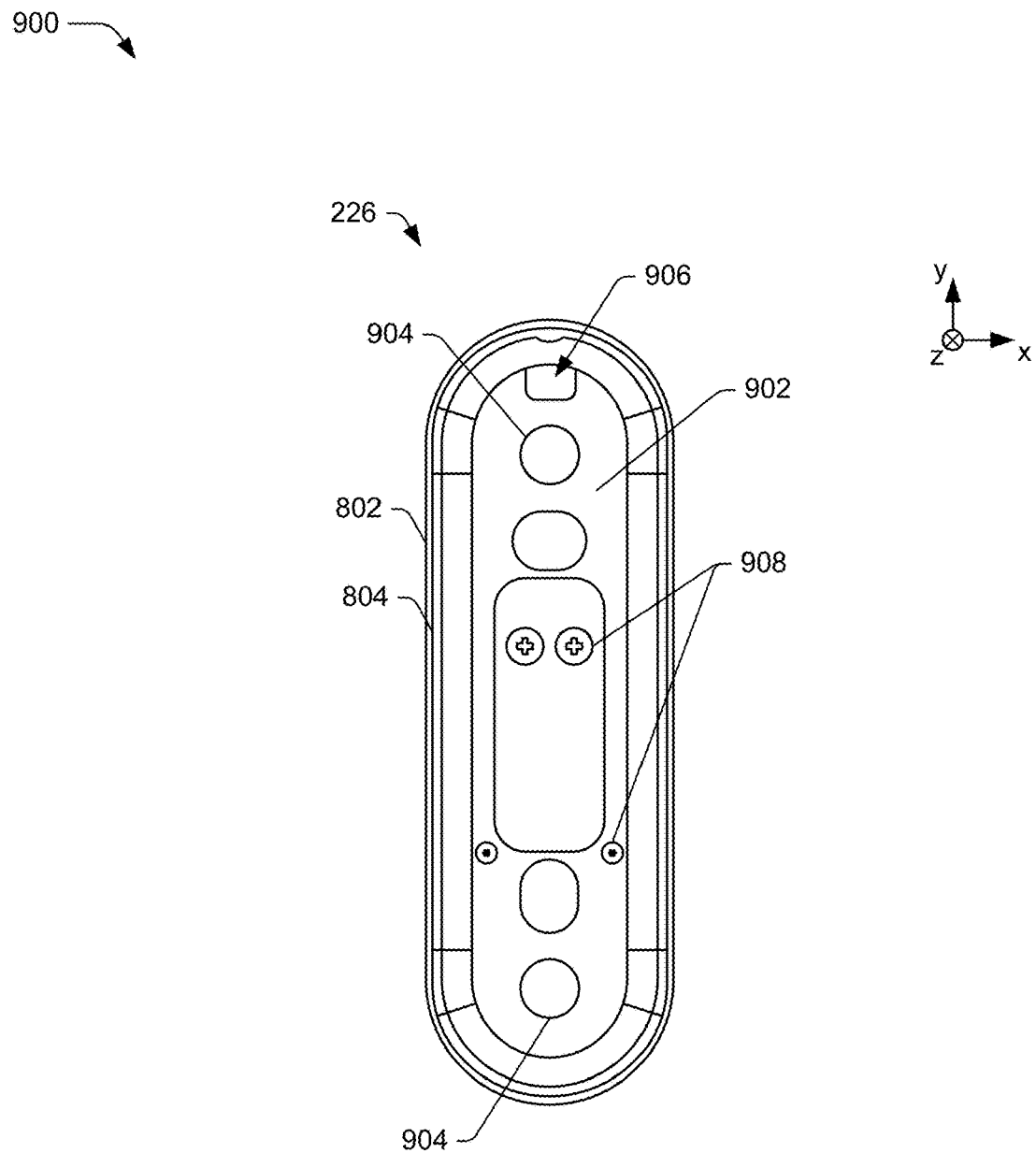
FIG. 9 illustrates a rear elevational view of the example doorbell in FIG. 6.

FIG. 9 illustrates a rear elevational view 900 of the example doorbell 226 in FIG. 6. In the illustrated example, the doorbell 226 includes a rear exterior surface 902 of the rear housing member 804, which includes one or more features for mounting the doorbell 226 to a surface such as a wall. As described in more detail herein, the doorbell 226 includes one or more mounting studs 904 disposed on the rear exterior surface 902 of the doorbell 226. The mounting studs 904 are usable for mounting the doorbell to a wall plate, a bracket, or other part connected to the wall. The rear exterior surface 902 also includes or defines a recessed volume 906, which receives a locking tab of the wall plate to secure the doorbell 226 to the wall plate. Further discussion of this and other features is provided in more detail below. Additional fasteners 908 may be used to secure the rear housing component 804 to one or more internal components (e.g., a heat sink, printed circuit board) and/or to the front housing component 802.

Figure 10:
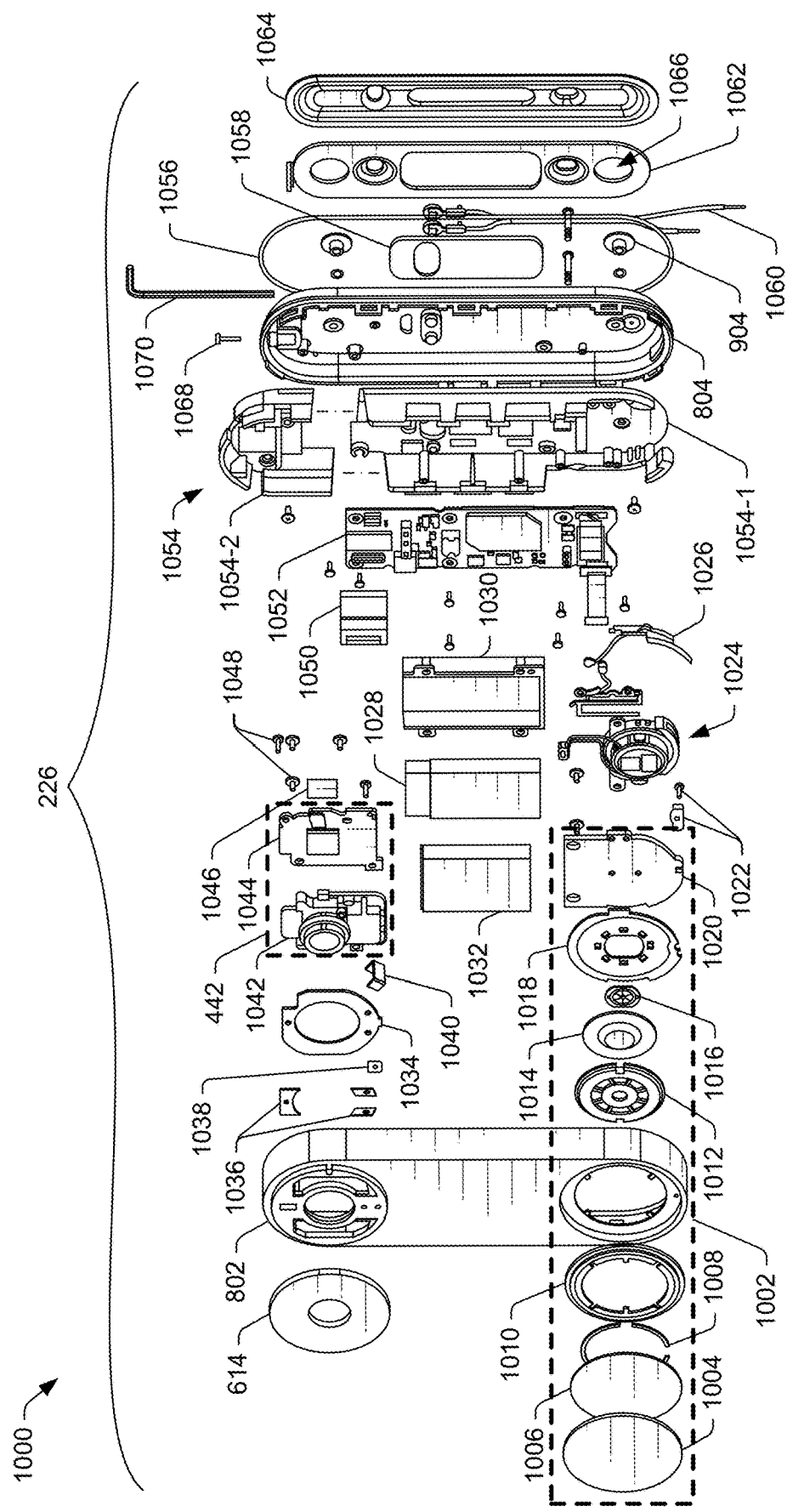
FIG. 10 illustrates an exploded view of the example doorbell in FIG. 6.

FIG. 10 illustrates an exploded view 1000 of the example doorbell 226 in FIG. 6. The front housing component 802 and the rear housing component 804 connect together to form a housing that encloses various components of the doorbell 226. The IR cover 614 is assembled to an exterior surface (e.g., first surface, the front exterior surface 612 in FIG. 6) of the front housing component 802.

At the button-side end 610 the doorbell 226 includes a button subassembly 1002 (also referred to as the button 622), which is part light ring for animations to show when the button subassembly 1002 is being pressed. Additionally, the button subassembly 1002 is waterproof sealed to prevent water ingress into the interior of the device through or around the button subassembly 1002. The button subassembly 1002 may include a button cap 1004, a first reflector 1006, button foam 1008, a button flange 1010, a light guide 1012, an elastic button web 1014, a dome 1016, a second reflector 1018, and a button PCB (e.g., button board 1020). One or more fasteners (e.g., fasteners 1022) may be used to assemble the components of the button subassembly 1002 together. Pressing the button cap 1004 on the button subassembly 1002 completes an electrical circuit on the button board 1020, which enables detection of a presence of a person.

The doorbell 226 also includes a speaker subassembly 1024 and one or more antennas 1026, which are assembled in proximity to one another and to the button subassembly 1002. The doorbell 226 includes a battery 1028, which may be seated into a battery frame 1030. A heat spreader 1032 (e.g., graphite) may be wrapped around the battery 1028 to evenly distribute heat to the battery 1028 and maintain a temperature gradient of the battery 1028 within a desired level when the doorbell 226 is exposed to a cold environment (e.g., sub-zero temperatures). The heat spreader 1032 is also configured to even out the heating that occurs when heat resistors (e.g., resistors 1104 in FIG. 11) are activated or when an external load from the sun (e.g., solar load) applies heat to one side of the doorbell 226.

At the camera-side end 608, the doorbell 226 may include a PCB 1034, which may be a subassembly for IR sensors (passive infrared sensors), IR LEDs, and/or audio sensors (e.g., microphone). Pressure-sensitive adhesive (PSA) 1036 may be disposed between the PCB 1034 and the front housing component 802. Also, mesh 1038 for the audio sensor (e.g., microphone) may be disposed adjacent to the audio sensor. Additionally, an IR flexible printed circuit (FPC) 1040 may connect the PCB 1034 to the camera module 442. The camera module 442 includes a camera subassembly 1042 and a PCB (e.g., camera board 1044). The camera subassembly 1042 is aligned with the IR cover 614. In aspects, one or more thermal interface materials (TIMs) 1046 may be disposed adjacent to the camera board 1044 to transfer heat generated by one or more integrated circuit components on the camera board 1044, including an image sensor. Fasteners 1048 may be used to fasten the camera board 1044 to the camera subassembly 1042 and/or the front housing component.

A main FPC 1050 may be used to connect the camera board 1044 to a main logic board (MLB) subassembly 1052 for the doorbell 226. The MLB subassembly 1052 is positioned toward the back of the product assembly to avoid coupling heat generated by the MLB subassembly 1052 with a heat load from external sources (e.g., solar load from the sun). The heat sink 1054 is disposed adjacent to the MLB subassembly 1052 and the camera board 1044 to passively distribute heat away from the MLB subassembly 1052 and the camera board 1044 and transfer the heat toward the housing, including the rear housing component 804. In addition, the heat sink 1054 is used as a ground plane for a plurality of the electrical components within the doorbell 226.

The heat sink 1054 includes multiple sections (e.g., a first section 1054-1, a second section 1054-2). The first section 1054-1 and the second section 1054-2 both nest into the rear housing component 804. In aspects, the first section 1054-1 is disposed adjacent to the MLB subassembly 1052 and is configured to absorb and distribute heat from the MLB subassembly 1052. The first section 1054-1 transfers the heat generated by the MLB subassembly 1052 to a lower portion of the housing, including the button-side end 610. The first section 1054-1 is also coupled to the antennas 1026 to electrically ground the antennas 1026. The second section 1054-2 is disposed adjacent to the camera subassembly 1042 and is configured to absorb and distribute heat from the camera subassembly 1042. In particular, the image sensor (e.g., image sensor 408) is cooled through the rear side of the camera board 1044 with TIM 1046 (e.g., thermal gel) and graphite that is placed inside of an electromagnetic interference (EMI) shield to spread the heat before the heat is transferred to the larger camera heatsink (e.g., the second section 1054-2). Accordingly, the heat sink 1054 enables the amount of heat sink necessary for the camera subassembly 1042 to be separate from the amount of heat sink necessary for the MLB subassembly 1052. Dividing the heat sink 1054 into separate sections for the different heat generating subassemblies provides a significant reduction in temperature, thereby enhancing passive thermal control over conventional doorbell devices that use a single heat sink for both the MLB and the camera module.

In some implementations, the two parts of the heat sink 1054 form a substantially obround shape (in the xy-plane). The first section 1054-1 is significantly longer (at least by a factor of 2, e.g., 2, 2.5, 3, 3.5, 4) along the y-axis in comparison to the second section 1054-2. Further, the first section 1054-1 includes a base surface and side walls that extend in a direction of the z-axis from the base surface (e.g., toward the front of the doorbell 226). In some aspects, the base surface may be substantially planar. The side walls of the first section 1054-1 help transfer heat generated by the MLB subassembly 1052 toward the lateral sides (e.g., left and right lateral sides relative to the front exterior surface 612 of the front housing component 802) of the housing. During cold ambient temperatures, the side walls of the first section 1054-1 help transfer heat from heat-dissipating components on the MLB subassembly 1052 to the internal air of the assembly to warm the battery 1028 (further details of warming the battery 1028 are described with respect to FIG. 11).

A gasket 1056 (e.g., an O-ring) may be disposed between the rear housing component 804 and the front housing component 802 to form a seal and prevent water ingress along the seam between the housing components 802 and 804. The doorbell 226 may also include a label plate 1058 for adding and/or interchanging one or more labels. Electrical connectors 1060 (e.g., wiring, dongle) are used to connect the doorbell 226 to line power. To mount the doorbell 226 to a surface (e.g., a wall), a wall plate 1062 and/or a wedge 1064 may be used. The wall plate 1062 and the wedge 1064 may be fixed to the surface (e.g., a wall). The wall plate 1062 may include any suitable rigid material, including sheet metal (e.g., made from stainless steel). In some aspects, spacers are used between the wall plate 1062 and the wedge 1064 to help prevent the wall plate 1062 from bending or becoming stuck during assembly to the wedge 1064. The wedge 1064 is configured with non-parallel front and rear surfaces, which provide an angle relative to the wall. Accordingly, by fixing the wedge 1064 to the wall, and the doorbell 226 (including the wall plate 1062) to the wedge 1064, the doorbell 226 can be tilted relative to the wall. In this way, the wedge can provide a sideways (left and right) tilt angle or a downward (toward the ground) tilt angle to enable the doorbell's camera (e.g., camera subassembly 1042) to tilt downward down the user's front doorway path (e.g., porch, down front stairs). In some implementations, the downward or sideways tilt angle(s) may be within a range of 10 degrees to 30 degrees (e.g., 20 degrees) relative to the wall.

The doorbell 226 includes one or more mounting studs 904, which are attached to the rear housing component 804 and are configured to hook onto the wall plate 1062 to secure the doorbell 226 to the surface to which the wall plate 1062 is affixed. In particular, the mounting studs 904 can be inserted through openings 1066 (e.g., holes) in the wall plate 1062 and then slidable moved along a direction of a plane defined by a front surface of the wall plate 1062. This positioning and movement causes a portion of a head of the mounting stud 904 to tuck behind the wall plate 1062, such that a portion of the wall plate 1062 rests between the head of the mounting stud 904 and the rear housing component 804. Accordingly, the mounting stud 904 assembled to the wall plate 1062 in this way prevents movement of the doorbell 226 along the z axis (e.g., direction normal to the surface of the wall plate 1062) relative to the wall plate 1062 (and to the surface to which the wall plate 1062 is fixed). After assembling the doorbell 226 to the wall plate 1062, a lock fastener 1068 may be used to further secure the doorbell 226 to the wall plate 1062. A hex key 1070 (e.g., Allen key) or other suitable tool may be used to insert and tighten the lock fastener 1068 into place.

Figure 11:
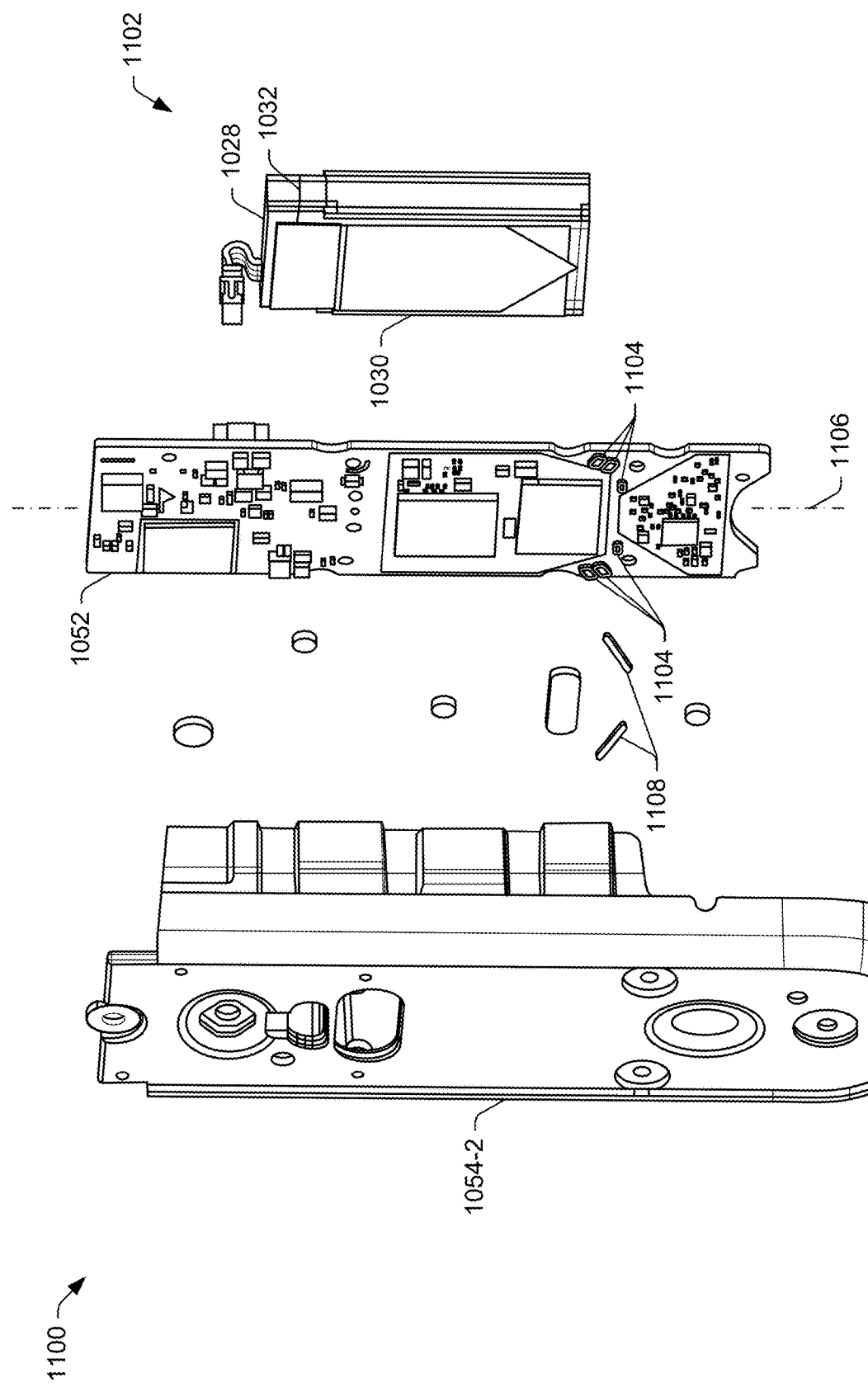
FIG. 11 illustrates a portion of the exploded view of FIG. 10, showing a rear side of the heat sink, the main logic board subassembly, and a battery subassembly.

FIG. 11 illustrates a portion of the exploded view 1000 of FIG. 10, showing a rear side of the heat sink 1054, the MLB subassembly 1052, and a battery subassembly 1102. The battery subassembly 1102 includes the battery 1028 seated in the battery frame 1030. When assembled, the doorbell 226 includes an airgap (not shown in FIG. 11) between the front housing component 802 and the battery subassembly 1102, where the airgap is specifically provisioned to avoid solar loads affecting the battery 1028 by, e.g., effectively insulating the battery 1028 from external loads. This airgap also provides space for swell in the battery 1028, which may occur as the battery 1028 ages.

In some implementations, the battery 1028 may also be wrapped in a heat spreader 1032 (e.g., graphite). The battery 1028 is used when a chime event occurs. For example, when the button is pressed, the circuit is effectively closed, and power is routed to the chime (separate device that is electrically connected to the doorbell 226). Thus, when the circuit is closed, the doorbell 226 does not receive line power for a predefined duration of time. Rather, the doorbell 226 runs on battery power over the predefined duration of time (e.g., 10 seconds) in which the chime is ringing. Consequently, during cold temperatures (e.g., sub-zero temperatures), the battery 1028 (without a heating mechanism) has a high resistance and may not be capable of supporting the doorbell 226 while the chime is ringing.

Generally, the battery 1028 has an operating temperature range for optimal performance. A battery temperature sensor (e.g., thermistor) may be implemented on the battery subassembly 1102 to monitor the battery temperature. At high temperatures, batteries can experience degradation due to overperformance of the battery chemistry. At low temperatures (e.g., sub-zero temperatures), conventional batteries perform poorly due to the cold causing slow chemical reactions in the battery chemistry. Different batteries may have different operating temperature ranges. For example, some batteries have an operating temperature range with a low-temperature boundary of 10° C. (e.g., a range from 10° C. to 80° C.). Some batteries may have an operating temperature range with a low-temperature boundary of 5° C. (e.g., a range from 5° C. to 85° C.). Accordingly, an ambient temperature down to e.g., −20° C. with approximately 1.5 m/s wind, can cause the temperature of the battery 1028 to decrease below the low-temperature boundary of the operating temperature range, resulting in a substantially non-operational battery. In such ambient circumstances, however, the battery 1028 can be heated using one or more heating mechanisms. In one example, the heat spreader 1032 may be wrapped around the battery 1028 to distribute the heat generated by the heating mechanism in a manner that maintains a gradient across the battery 1028 within a certain level (e.g., less than 5° C.). In some sub-zero ambient temperatures, however, many conventional battery heaters (e.g., a flexible circuit heater) may be insufficient to maintain the battery temperature at or above the low temperature boundary.

In aspects, the one or more heating mechanisms may include resistors 1104 disposed on a side of the MLB subassembly 1052 that interfaces with the heat sink 1054. The illustrated example shows six (6) resistors 1104 on the MLB subassembly 1052. However, any suitable number of resistors 1104 may be disposed on the MLB subassembly 1052 at any suitable location on the MLB subassembly 1052. In one example, the resistors 1104 are disposed toward one end of the MLB subassembly 1052. In the illustrated example, the resistors 1104 are disposed at a region that is approximately a quarter of the length of the MLB subassembly 1052 along a longitudinal axis 1106 of the MLB subassembly 1052. The resistors 1104 are board-resistor heaters. In aspects, the MLB subassembly 1104 includes a controller configured to control current flow to the resistors 1104 based on the battery temperature. In an example, the battery sensor provides the detected battery temperature to the controller to enable the controller to determine if the battery 1028 is within its operating temperature range. In some implementations, the controller on the MLB subassembly 1104 causes current to be provided to the resistors 1104 to overdrive the resistors 1104 and cause the resistors 1104 to dissipate heat. Any suitable amount of current or power can be used to overdrive the resistors 1104. In one example, power within a range of 3 Watts (W) to 5 W (including 4 W) are driven into the resistors 1104 to cause the resistors 1104 to dissipate heat. The power may be provided by the battery 1028 during a chime event (e.g., when the button is pressed). During low temperatures (e.g., sub-zero ambient temperatures), the resistors 1104 can be overdriven in this way. In an example, below a low-temperature threshold (e.g., 10° C., 5° C.), the resistors 1104 remain activated or ON to maintain the battery 1028 at the minimum required temperature at which the battery 1028 can be discharged for enabling the chime event.

When assembled, the resistors 1104 thermally connect to the heat sink 1054, via a thermal interface material 1108 (e.g., thermal gel), to provide heat to indirectly heat the battery 1028. For example, the resistors 1104 provide heat, which is transferred to the heat sink 1054. Then, the heat sink 1054 transfers the heat to the internal air of the doorbell 226, which warms the battery 1028. Further, the heat spreader 1032 (e.g., graphite) distributes the heat from the internal air across multiple surfaces of the battery 1028 to maintain the gradient across the battery 1028 within a desired level. Accordingly, using the resistors 1104 described herein enables the battery 1028 to be heated to within its operating temperature range during cold ambient temperatures in a manner that maintains the temperature of the battery 1028 within its operating temperature range.

Figure 12:
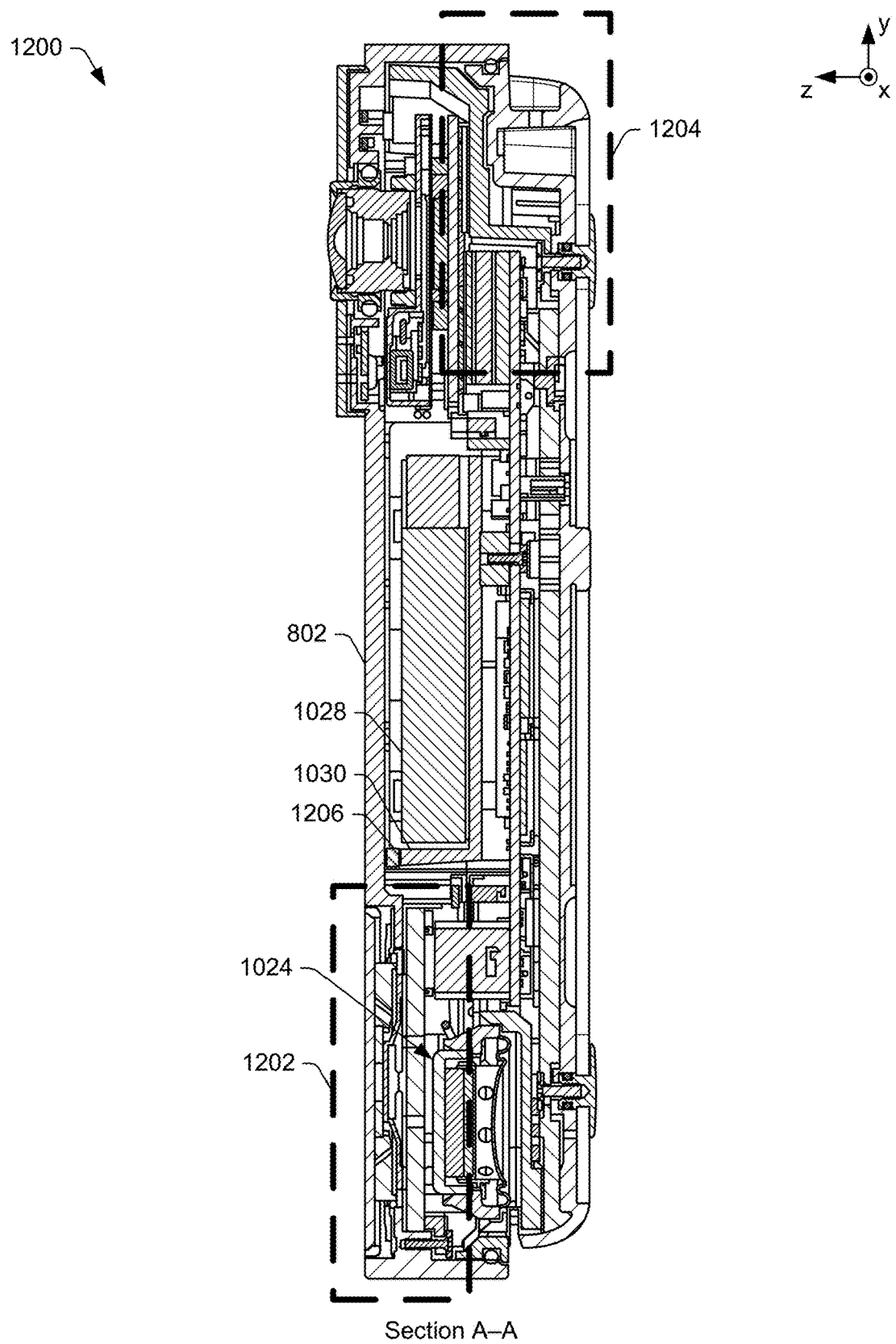
FIG. 12 illustrates a sectional view of the doorbell from FIG. 7, taken along line A-A in FIG. 7.

FIG. 12 illustrates a sectional view 1200 of the doorbell 226 from FIG. 7, taken along line A-A in FIG. 7. A portion 1202 of the sectional view 1200 is shown in more detail in FIG. 13, which illustrates an example stackup of the button subassembly 1002 at the button-side end 610 of the doorbell 226. A portion 1204 is shown in more detail in FIGS. 17A to 17C, which illustrate a locking mechanism to secure the doorbell 226 to the wall plate 1062.

The speaker subassembly 1024 may cause rub and buzz when producing certain frequencies of audio output. To reduce or prevent rub and buzz, an elastic material (e.g., rubber, foam) may be disposed between the battery frame 1030 and the front housing component 802. In the illustrated example, a strip or block 1206 of elastic material is disposed along the x-axis and separates the front housing component 802 from the battery frame 1030. In some aspects, the block 1206 provides a seal between the front housing component 802 and the battery frame 1030. Further, the block 1206 divides the internal air chamber of the doorbell 226 to protect rubbing and buzzing risk areas from the resonant frequency of the speaker subassembly 1024, which uses the rest of the doorbell 226 as its back volume.

Figure 13:
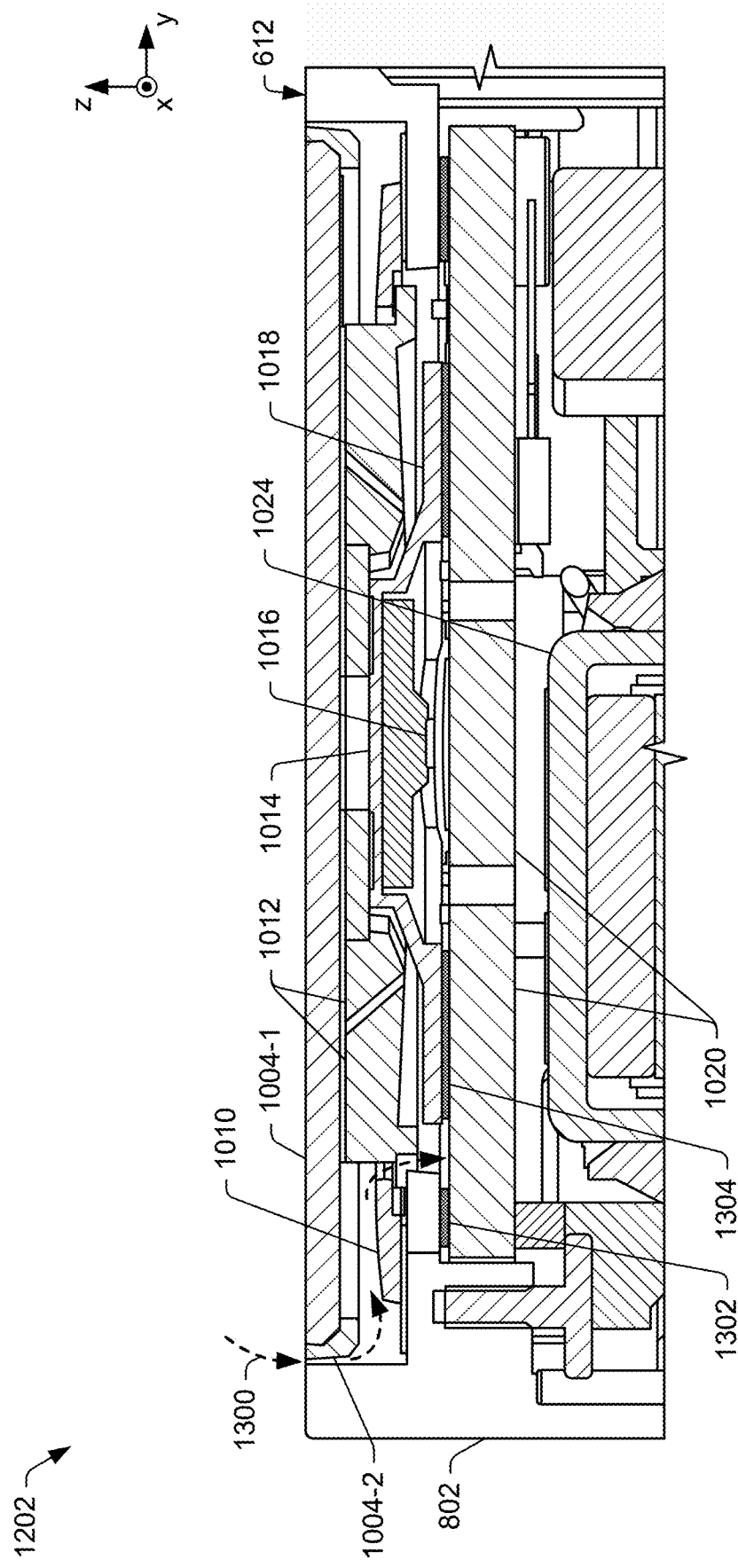
FIG. 13 illustrates the portion of the sectional view in FIG. 12, which includes an example stackup of the button subassembly.

FIG. 13 illustrates the portion 1202 of the sectional view 1200 in FIG. 12, which includes an example stackup of the button subassembly 1002. The button subassembly 1002 is constructed and integrated in the doorbell 226 in a way that (i) enables the button cap 1004 to be pressed at any location on its outer surface to activate the electrical component behind it, (ii) enables the button subassembly 1002 to be a light guide, and (iii) meets regulatory waterproof standards (e.g., at least ingress protection (IPX) standards, including an IPX5 rating).

In the illustrated example, the dome 1016 (e.g., a snap dome) is disposed on the button board 1020 over an electrical pattern that the dome 1016 completes when the dome 1016 is forced to contact the electrical pattern. Completing the electrical pattern initiates a chime event. In some implementations, the elastic button web 1014 includes a silicon rubber piece that is collapsible to apply a force to a head of the dome 1016 to cause the dome 1016 to contact the electrical pattern and complete the circuit. The elastic button web 1014 may include any suitable elastic material, including plastic, foam, and so on. Above the elastic button web 1014 is the light guide 1012. The light guide 1012 has a specifically angled geometry to direct light from the LEDs on the button board 1020 toward the sides of the button cap 1004. For example, the LEDs provide light generally in the direction of the z-axis and the light guide 1012 directs the light in the direction of the xy-plane. The light travels through the light guide 1012 and into the button flange 1010, which directs the light toward the edges of the button cap 1004.

The button cap 1004 forms a pressable button on the front exterior surface 612 of the housing. The button cap 1004 is a multi-shot material, which includes first and second shots (e.g., first shot 1004-1 and second shot 1004-2) of injection-molded material. The first shot 1004-1 forms the center of the button cap 1004 and is substantially opaque to at least visible light. The second shot 1004-2 forms the edges of the button cap 1004 is substantially transparent to visible light to enable the light from the LEDs to exit out the front of the doorbell 226. In particular, the second shot 1004-2 of the button cap 1004 diffuses the light and the light exits the second shot 1004-2 generally in the direction of the z-axis (e.g., out the front of the doorbell 226). In some implementations, the second shot 1004-2 of the button cap 1004 evenly distributes the diffused light around the button cap 1004.

The button subassembly 1002 prevents hot spots or dim spots in the light guide 1012 due to a mix of the types of material used and the geometry of the light guide 1012 itself, which spreads the light out.

Because the button subassembly 1002 functions as a mechanical button that is pressable, the button cap 1004 is movable relative to the front housing component 802, resulting in an area (around the button cap 1004) that is vulnerable to water ingress. The path of water ingress is denoted by arrows 1300. For example, water can enter the device around the edges of the button cap 1004 and pass through the space around the button flange 1010 and to a portion of the button board 1020. However, seals 1302 and 1304 prevent further ingress of the water. The seal 1302 is disposed between the front housing component 802 and the button board 1020. In some implementations, the seal 1302 may be PSA. The seal 1304 is disposed between the button board 1020 and the elastic button web 1014 to prevent water from reaching and damaging the electrical circuit on the button board 1020. Having internal seals (e.g., seals 1302 and 1304) enables mechanical movement of the button cap 1004 relative to the front housing component 802 and also allows some water ingress but prevents water ingress into any areas where the water can cause damage.

In addition, the button board 1020 has a thickness that provides strength against high pressing forces applied to the button cap 1004. Many conventional video-recording doorbells include a battery behind the button board 1020 but the doorbell 226 described herein does not, which provides additional space within the device for added thickness to the button board 1020.

Figure 14:
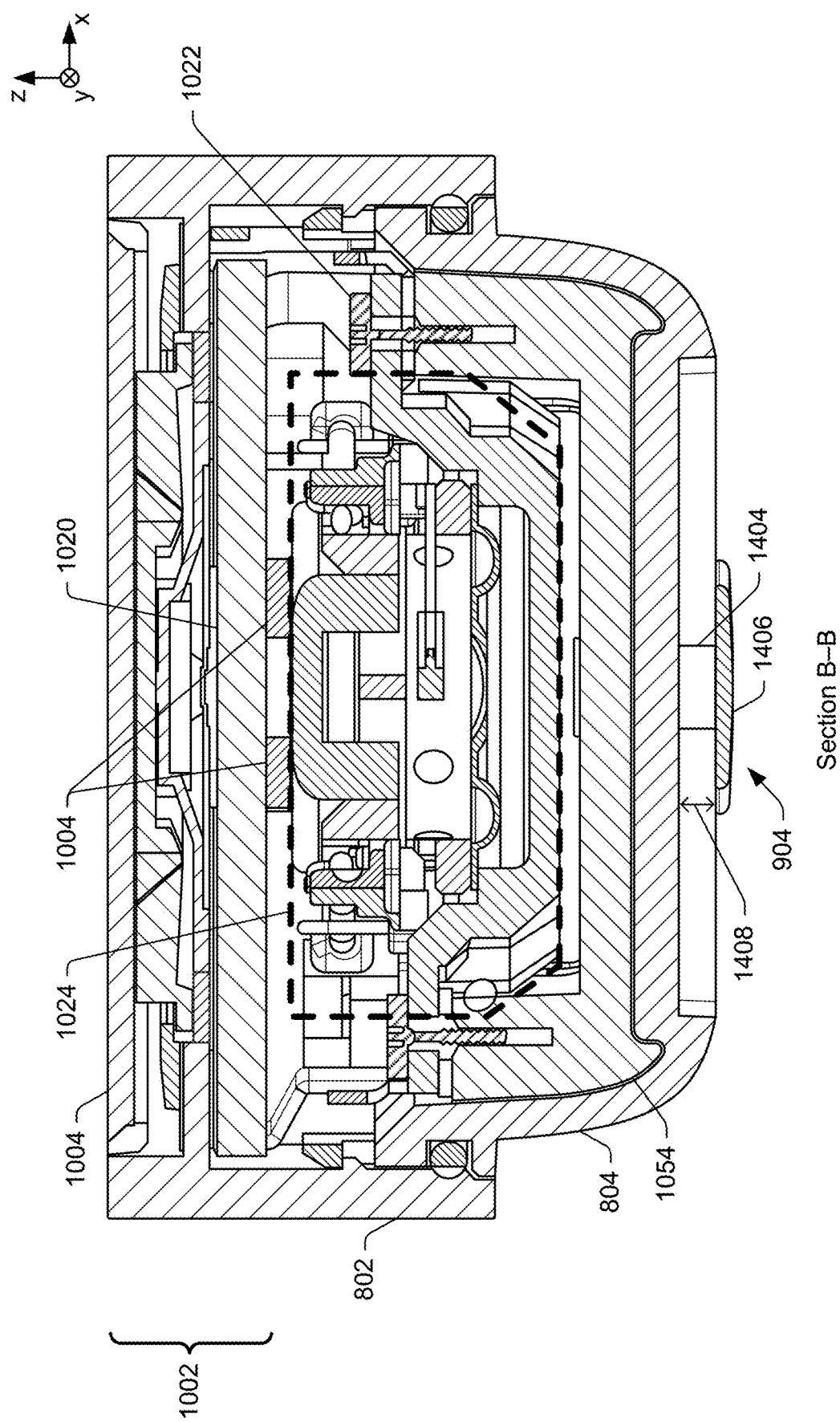
FIG. 14 illustrates the sectional view of the example doorbell from FIG. 7, taken along line C-C in FIG. 7.

FIG. 14 illustrates the sectional view 1400 of the doorbell 226 from FIG. 7, taken along line C-C in FIG. 7. In particular, the sectional view 1400 is taken across the button subassembly 1002 along the x-axis. As illustrated, the button subassembly 1002 is disposed toward the front of the device. Under the button board 1020 is a layer of speaker foam 1402, which separates the button board 1020 from the speaker subassembly 1024. The speaker foam 1402 is implemented to reduce rub and buzz caused by movement of the speaker subassembly 1024 along the z-axis relative to the button board 1020. The speaker subassembly 1024 is fastened to the heat sink 1054 via one or more fasteners 1022. The heat sink 1054, in particular the first section 1054-1 of the heat sink 1054, is separated from the speaker subassembly 1024 by a gap, which enables movement of the speaker subassembly 1024 relative to the first section 1054 of the heat sink 1054 in the direction of the z-axis. The heat sink 1054 is adjacent to the rear housing component 804 to transfer heat to the rear housing component 804 to passively cool the device. The front housing component 802 may connect to the rear housing component 804 via any suitable connection mechanism, including protrusions and recesses that enable the housing components to snap-fit together. Attached to the rear housing component 804 is the mounting stud 904, which includes a shaft 1404 connected to a head 1406. The head 1406 is wide relative to the shaft 1404 because the head 1406 has a diameter that is greater than a diameter of the shaft 1404. Consequently, the head 1406 extends outwardly from the shaft 1404 in the xy plane. The shaft creates a gap 1408 between the rear housing component 804 and the head 1406 of the mounting stud 904. When the doorbell 226 is assembled to the wall plate 1062, a portion of the wall plate 1062 slidably moves (in the direction of the y-axis) into the gap 1408 to restrict or prevent movement of the doorbell 226 in the direction of the z-axis relative to the wall plate 1062 (and relative to the surface on which the wall plate 1062 is fixed). Due to the shape and orientation of the mounting stud 904 and the wall plate 1062 when assembled together, the doorbell 226 is immobilized with respect to the directions of both the x-axis and the z-axis, which reduces or prevents wiggle or wobble of the doorbell 226 relative to the wall plate 1062. Further details are described with respect to FIG. 15.

Figure 15:
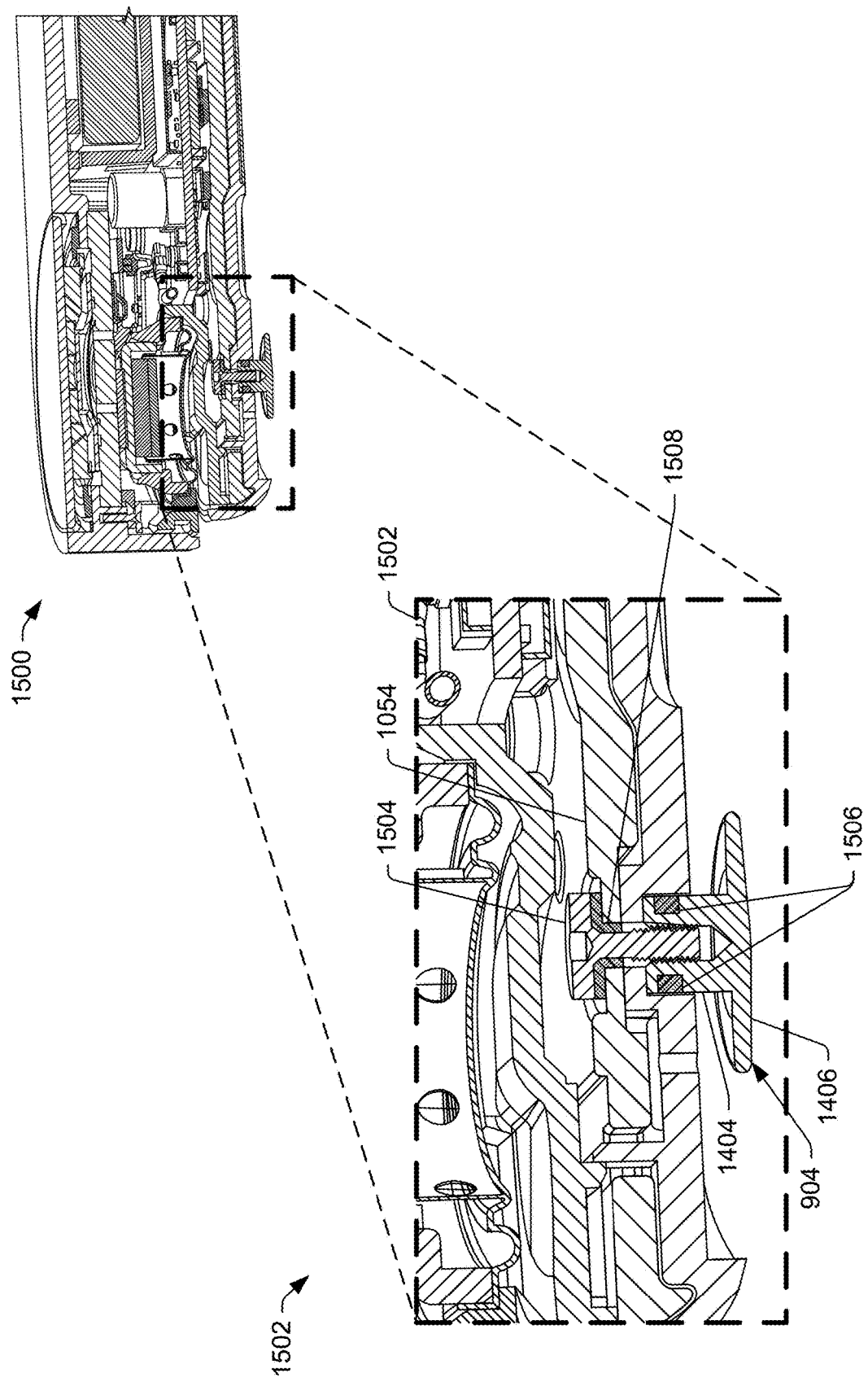
FIG. 15 illustrates a perspective sectional view of the button-side end of the doorbell, taken along line A-A in FIG. 7, and an enlarged view of a portion of the sectional view having the mounting stud 904.

FIG. 15 illustrates a perspective sectional view 1500 of the button-side end 610 of the doorbell 226, taken along line A-A in FIG. 7, and an enlarged view 1502 of a portion of the sectional view 1500 having the mounting stud 904. As illustrated in FIG. 15, the mounting stud 904 fastens to a fastener 1504 (e.g., screw, bolt), which is positioned inside the housing and extends through the heat sink 1054 and the rear housing component 804. For example, the mounting stud 904 may have a threaded interior surface, to which the fastener 1504 is threaded. Further, a seal 1506 is disposed around (e.g., encircles) the shaft 1404 of the mounting stud 904 to provide a seal against water ingress into the interior of the doorbell 226 via the space between the rear housing component 804 and the shaft 1404 of the mounting stud 904.

In addition, a non-conductive separator 1508 (e.g., washer, shoulder washer) is adjacent to the fastener 1504 to insulate against moisture and electricity. The fastener 1504 is inserted through an aperture in the separator 1508 to separate and insulate the fastener 1504 from the heat sink 1054. Because the mounting stud 904, the fastener 1504, and the heat sink 1054 are metal parts that are electrically conductive, there is a risk that an electrical short applied to the mounting stud 904 can travel through the mounting stud 904 to the fastener 1504, through the fastener 1504 to the heat sink 1054, and through the heat sink 1054 to the main board (e.g., MLB subassembly 1052) or other circuitry. To prevent these parts from establishing a conductive path in this way, the separator 1508 is disposed between the fastener 1504 and the heat sink 1054. The separator 1508 is a non-conductive material (e.g., plastic, rubber) to prevent grounding or shorting between the mounting stud 904 and the heat sink 1054 via the fastener 1504.

Figure 16:
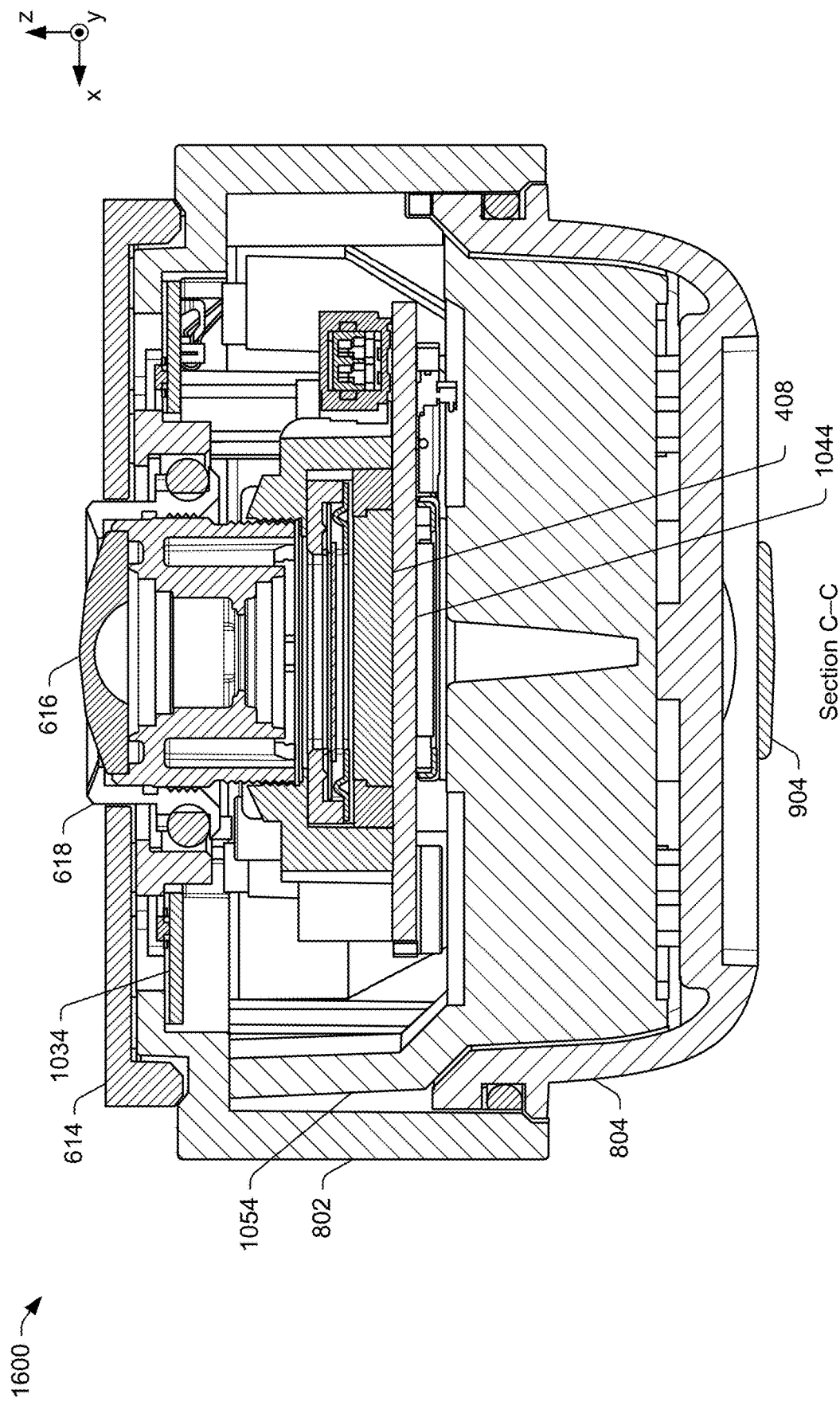
FIG. 16 illustrates a sectional view of the example doorbell in FIG. 7, taken along line C-C in FIG. 7.

FIG. 16 illustrates a sectional view 1600 of the example doorbell 226 in FIG. 7, taken along line C-C in FIG. 7. The sectional view 1600 illustrates a stackup of the doorbell 226 at the camera-side end 608. At the back of the doorbell 226 is the mounting stud 904, which is connected to the rear housing component 804. The heat sink 1054 is seated or nested within the rear housing component 804. The rear housing component 804 is removably attached (e.g., snapped) to the front housing component 802 at multiple locations around a perimeter of the rear housing component 804. In aspects, an outer surface of the rear housing component 804 attaches to an inner surface of the front housing component 802. In this way, the rear housing component 804 is visually hidden by the front housing component 802 in the front elevational view of the doorbell 226. Stacked above the heat sink 1054 at the camera-side end 608 is the camera module 442, which includes, among other components, the camera board 1044, the image sensor 408, the camera lens 616, and the retainer 618. Adjacent to the retainer 618 is the IR cover 614, which surrounds the retainer 618 and the camera lens 616 in the xy-plane and covers the PCB 1034, which may include IR LEDs.

Figure 17A:
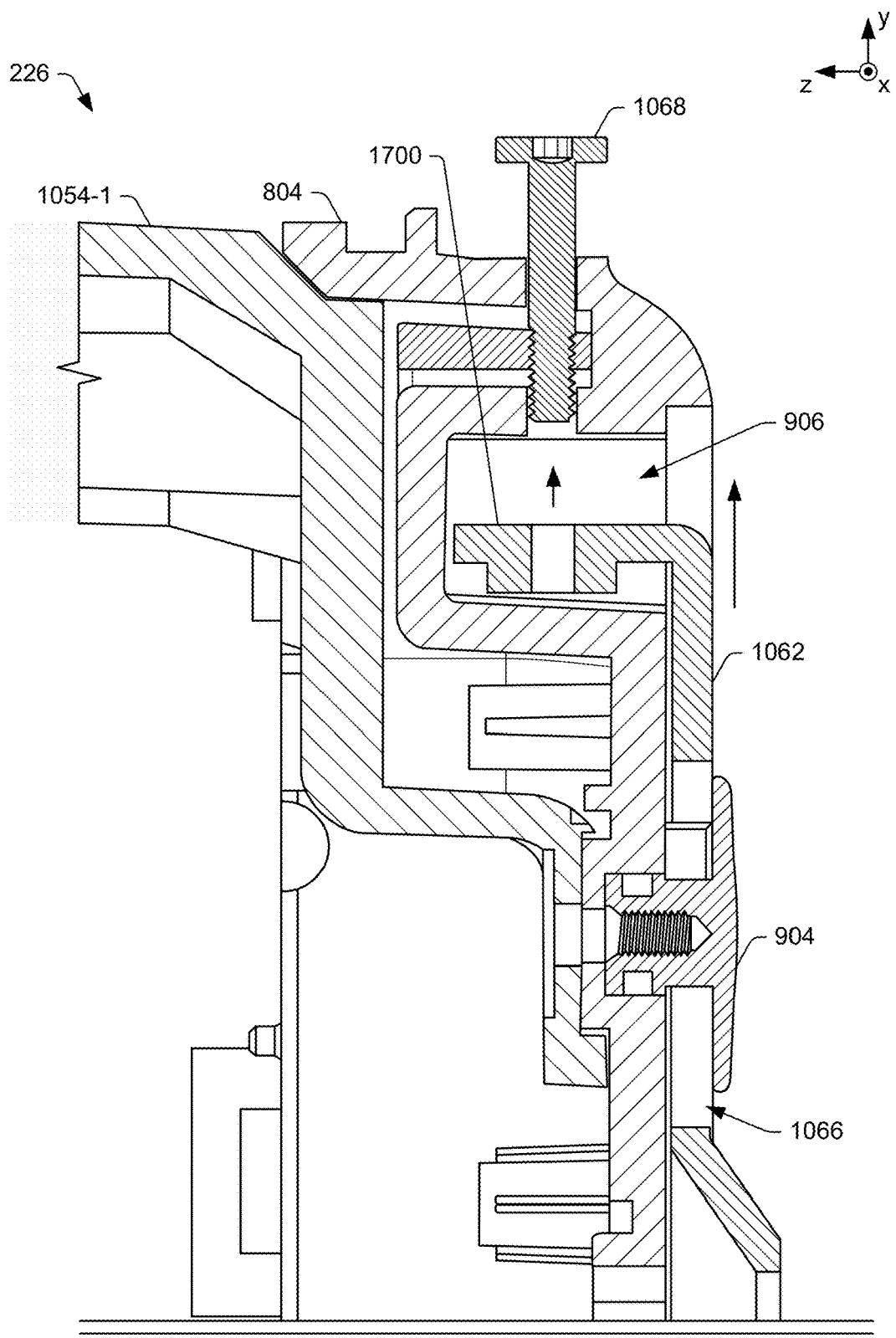
FIGS. 17A, 17B, and 17C illustrate a locking mechanism for securing the doorbell to the wall plate.
Figure 17B:
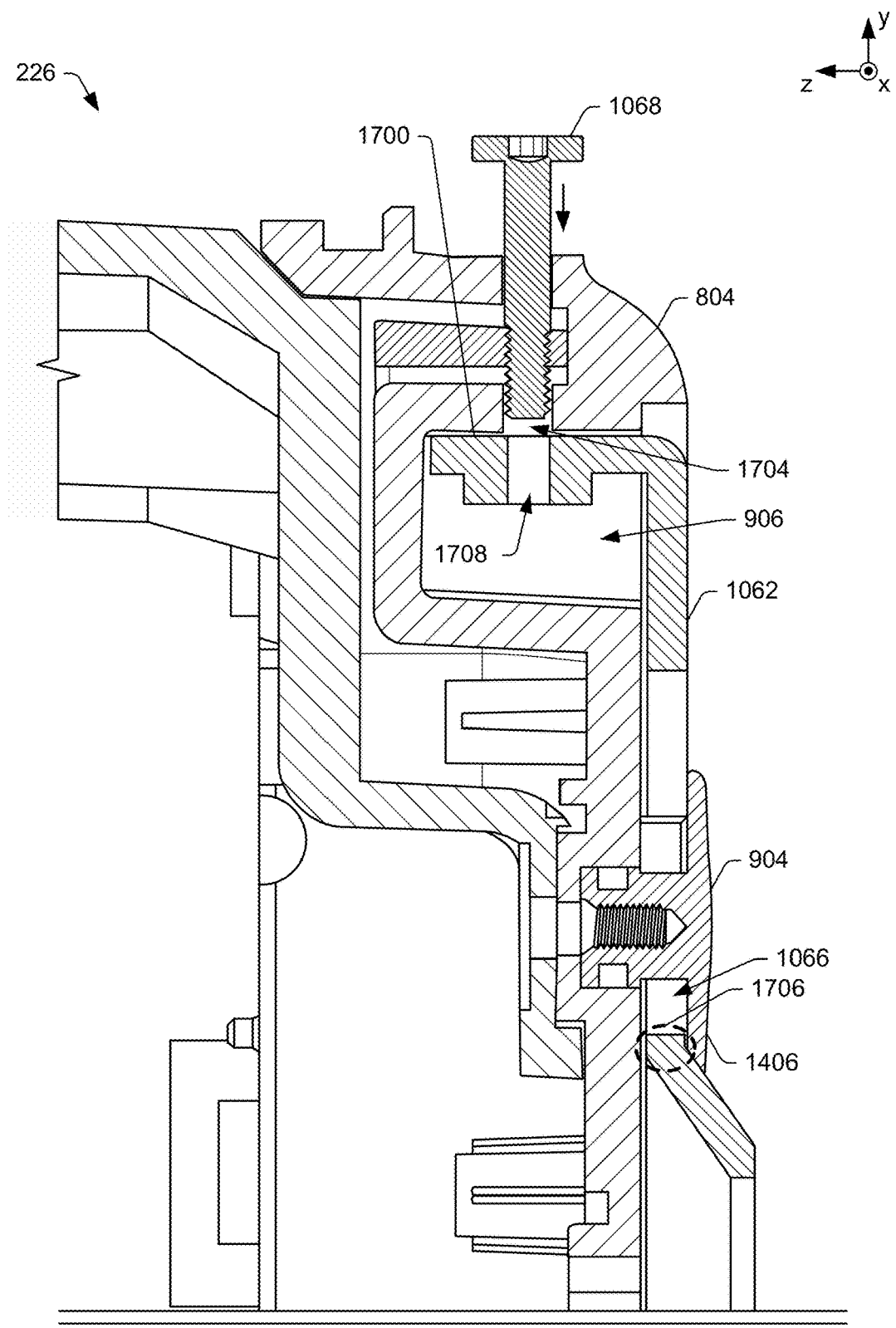
Figure 17C:
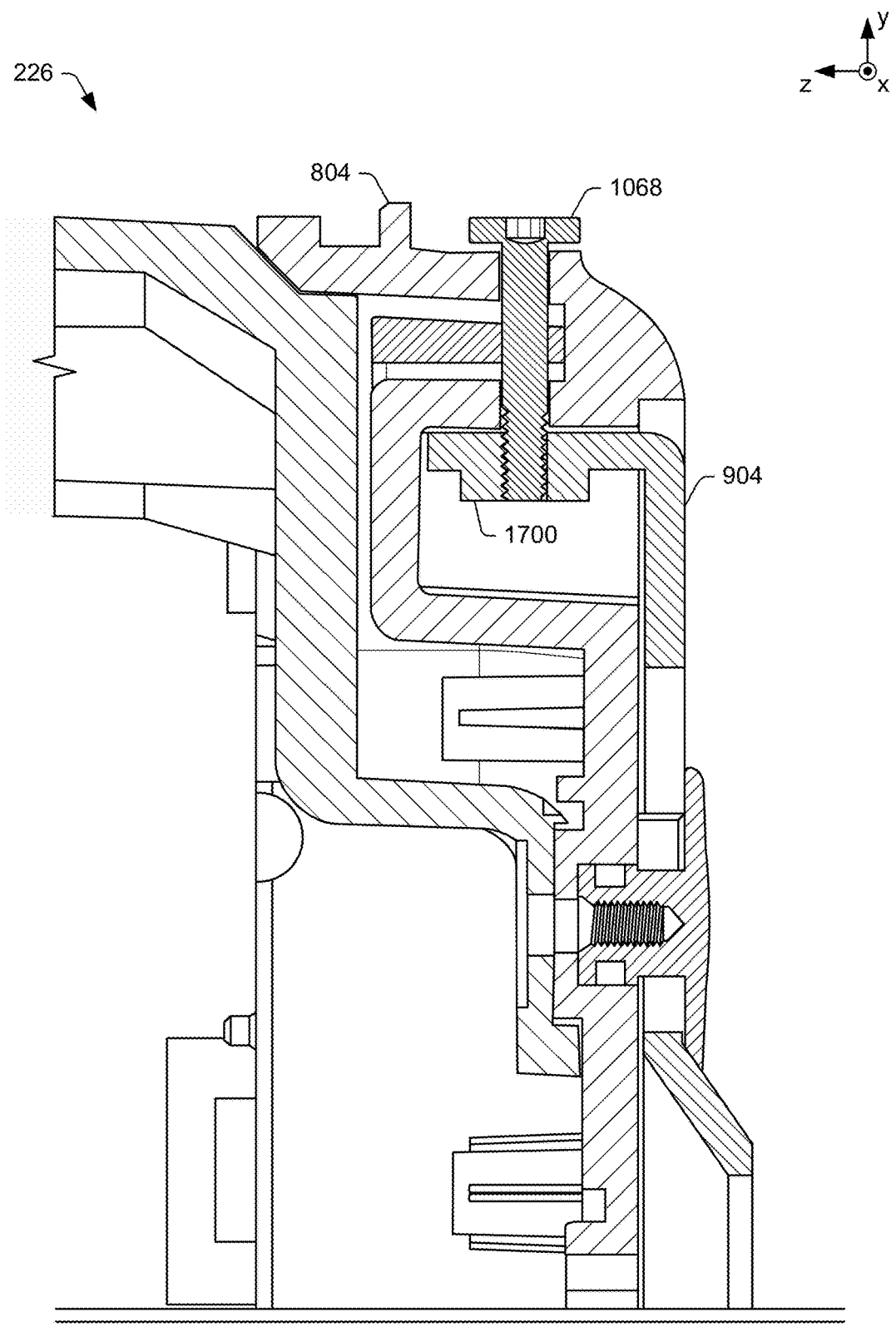

FIGS. 17A, 17B, and 17C illustrate a locking mechanism for securing the doorbell 226 to the wall plate 1062. Beginning in FIG. 17A, the doorbell 226 is placed adjacent to the wall plate 1062 such that the mounting stud 904 is inserted through the opening 1066 in the wall plate 1062 (e.g., along the z-axis). The wall plate 1062 includes a front surface configured to abut the rear exterior surface of the rear housing component 804. The wall plate 1062 also has a locking tab 1700, which extends outwardly from the front surface and is configured to be inserted into the recessed volume 906 of the rear housing component 804. Then, the doorbell 226 is slidably moved downward (in the −y direction) such that, relative to the doorbell 226, the wall plate 1062 slides upward (in a direction of the y-axis toward the top of the doorbell 226, e.g., toward the lock fastener 1068).

Continuing in FIG. 17B, the locking tab 1700 of the wall plate 1062 is now disposed adjacent to a side of the recessed volume 906 that includes an aperture 1704 through which the lock fastener 1068 is inserted. In addition, the mounting stud 904 overlaps a portion of the wall plate. For example, the wall plate 1062 includes a portion 1706 that is now disposed between the head 1406 of the mounting stud 904 and the rear housing component 804, thereby preventing movement of the doorbell 226 in the direction of the z-axis relative to the wall plate 1062. In this way, the head 1406 of the mounting stud 904 is disposed between the wall plate 1062 and the surface to which the wall plate 1062 is affixed. Due to the shape of the head 1406 of the mounting stud 904 and the shape of the opening 1066 in the wall plate 1062 after the mounting stud 904 slidably moves into position, movement of the doorbell 226 in the direction of the x-axis is also prevented. For example, the head 1406 of the mounting stud 904, when assembled to the wall plate 1062, overlaps the wall plate 1062 in at least the x-dimension. In some implementations, the mounting stud 904, when assembled to the wall plate 1062, overlaps the wall plate 1062 in both the x- and y-dimensions. The lock fastener 1068 is then inserted through an aperture 1708 in the locking tab 1700 of the wall plate 1062.

Continuing in FIG. 17C, the lock fastener 1068 is fastened (e.g., threaded) to the locking tab 1700 of the wall plate 1062 to secure the rear housing component 804 to the wall plate 1062 in the direction of the y-axis (e.g., lateral axis 604). This fastening prevents movement of the doorbell 226 along the y axis relative to the wall plate 1062.

These and other capabilities and configurations, as well as ways in which entities of FIGS. 1A and 1B act and interact, are set forth in greater detail below. These entities may be further divided, combined, and so on. The environment 100 of FIG. 1A and the detailed illustrations of FIG. 1B through FIG. 17C illustrate some of many possible environments, devices, and methods capable of employing the described techniques, whether individually or in combination with one another.

Some examples are described below:

A video-recording doorbell comprising: a housing having a front exterior surface and an opposing rear exterior surface, the housing having a height along a y-axis that is greater than a width along an x-axis and a depth along a z-axis, the front exterior surface being normal to the z-axis, the front exterior surface having first and second opposing ends along the y-axis; a camera module disposed at the first end of the housing, the camera module configured to operate an image sensor and associated circuitry to capture video data, the camera module having a camera lens that extends outwardly from the front exterior surface of the housing and is exposed to an environment surrounding the video-recording doorbell; a printed circuit board disposed within the housing and having circuitry configured for continuous recording of the video data; a button subassembly disposed at the second end of the housing and configured to be pressed by a person to initiate a chime event for a predefined duration of time; a battery configured to provide power to the circuitry during the chime event; and a heat sink having a separate first and second sections, the first section of the heat sink disposed adjacent to the printed circuit board, the second section of the heat sink disposed adjacent to the camera module, the first section positioned adjacent to the second section in a direction of the y-axis.

The video-recording doorbell may further comprise an infrared cover disposed at the first end of the housing, the infrared cover configured to be transparent to infrared light, the camera lens extending through an opening in the infrared cover.

The camera module may have a lens retainer disposed between the camera lens and the infrared cover.

The first section of the heat sink may be longer than the second section along the y-axis by at least a factor of two.

The first section of the heat sink may include a base surface and side walls that extend outwardly along the z-axis from the base surface, the side walls configured to transfer heat toward lateral sides of the housing, which are separated by the width of the housing.

The button subassembly may include: a button board having an electrical pattern for initiating the chime event; a dome configured to complete a circuit when forced to contact the electrical pattern; an elastic button that is collapsible to apply force to the dome to cause the dome to contact the electrical pattern and complete the circuit; a light guide disposed adjacent to the elastic button; and a button cap forming a pressable button on the front exterior surface of the housing.

The video-recording doorbell may further comprise: a first seal disposed between the button board and a front housing component of the housing; and a second seal disposed between the button board and the elastic button, wherein the first and second seals prevent water ingress in the housing between the housing and a button cap of the button subassembly from reaching the electrical pattern on the button board.

The video-recording doorbell may further comprise one or more board-resistor heaters disposed on the printed circuit board and configured to dissipate heat to the heat sink to indirectly warm to the battery based on the heat sink transferring the heat to the battery via internal air of the video-recording doorbell.

The board-resistor heaters may be thermally connected to the heat sink.

The board-resistor heaters may be configured to generate heat to maintain a temperature of the battery within an operating temperature range.

The video-recording doorbell may further comprise a heat spreader disposed adjacent to the battery and configured to distribute the heat from the internal air across multiple surfaces of the battery.

The video-recording doorbell may further comprise one or more mounting studs disposed on a rear exterior surface of the housing, wherein: a respective mounting stud of the one or more mounting studs is fixed to a fastener disposed within the housing; and the respective mounting stud includes: a shaft that extends outwardly from the rear exterior surface of the housing; and a head having a diameter greater than that of the shaft.

The video-recording doorbell may further comprise a wall plate configured to be affixed to a surface and support the housing, wherein the respective mounting stud is configured to be inserted through an opening in the wall plate and overlap a portion of the wall plate to secure the housing to the wall plate.

The overlap between the mounting stud and the portion of the wall plate prevents movement of the housing along the z-axis and along the x-axis.

The wall plate may include a front surface and a locking tab that extends outwardly from the front surface; the rear exterior surface of the housing may define a recessed volume configured to receive the locking tab of the wall plate; and the housing may be fastened to the wall plate by a fastener inserted through an aperture in the housing and affixed to the locking tab of the wall plate to prevent movement of the housing relative to the wall plate along the y-axis.

Conclusion

Although aspects of a video-recording doorbell have been described in language specific to features and/or methods, the subject of the appended claims is not necessarily limited to the specific features or methods described. Rather, the specific features and methods are disclosed as example implementations of the techniques for the video-recording doorbell, and other equivalent features and methods are intended to be within the scope of the appended claims. Further, various different aspects are described, and it is to be appreciated that each described aspect can be implemented independently or in connection with one or more other described aspects.

What is claimed is:

1. A video-recording doorbell comprising:
   a housing having a front exterior surface and an opposing rear exterior surface, the housing having a height along a y-axis that is greater than a width along an x-axis and a depth along a z-axis, the front exterior surface being normal to the z-axis, the front exterior surface having first and second opposing ends along the y-axis;
   a camera module disposed at the first end of the housing, the camera module configured to operate an image sensor and associated circuitry to capture video data;
   a printed circuit board disposed within the housing and having circuitry configured for continuous recording of the video data;
   a button subassembly disposed at the second end of the housing and configured to be pressed by a person to initiate a chime event;
   a battery frame configured to accommodate a battery for providing power to the circuitry during the chime event; and
   board-resistor heaters including a plurality of resistors disposed on the printed circuit board and configured to dissipate heat to a heat sink to indirectly warm the battery based on the heat sink transferring the heat to the battery via internal air of the video-recording doorbell.

2. The video-recording doorbell of claim 1, wherein the board- resistor heaters are thermally connected to the heat sink.

3. The video-recording doorbell of claim 1, further comprising:
   a temperature sensor configured to detect a battery temperature of the battery; and
   a controller configured to control current flow to the board-resistor heaters based on the battery temperature, wherein the board-resistor heaters are configured to generate heat to maintain a temperature of the battery within an operating temperature range.

4. The video-recording doorbell of claim 1, further comprising a heat spreader disposed adjacent to the battery and configured to distribute the heat from the internal air across multiple surfaces of the battery.

5. The video-recording doorbell of claim 1, further comprising one or more mounting studs disposed on a rear exterior surface of the housing, wherein:
   a respective mounting stud of the one or more mounting studs is fixed to a fastener disposed within the housing; and
   the respective mounting stud includes:
   a shaft that extends outwardly from the rear exterior surface of the housing; and
   a head having a diameter greater than that of the shaft.

6. The video-recording doorbell of claim 5, further comprising a wall plate configured to be affixed to a surface and support the housing, wherein the respective mounting stud is configured to be inserted through an opening in the wall plate and overlap a portion of the wall plate to secure the housing to the wall plate.

7. The video-recording doorbell of claim 6, wherein the overlap between the mounting stud and the portion of the wall plate prevents movement of the housing along the z axis and along the x-axis.

8. The video-recording doorbell of claim 6, wherein:
the wall plate includes a front surface and a locking tab that extends outwardly from the front surface;
the rear exterior surface of the housing defines a recessed volume configured to receive the locking tab of the wall plate; and
the housing is configured to be fastened to the wall plate by a fastener inserted through an aperture in the housing and affixed to the locking tab of the wall plate to prevent movement of the housing relative to the wall plate along the y-axis.

9. The video-recording doorbell of claim 3, wherein the controller is disposed on the printed circuit board.

10. The video-recording doorbell of claim 3, wherein the controller is configured to overdrive the board-resistor heaters with current such that the plurality of resistors dissipate power within a range of 3 Watts to 5 Watts and generate heat.

11. The video-recording doorbell of claim 10, further comprising the battery, wherein the battery is configured to provide the power to the one or more board- resistor heaters during a chime event of the video-recording doorbell.

12. The video-recording doorbell of claim 1, further comprising the heat sink, wherein the heat sink is divided into first and second sections separated by a gap, the first section disposed adjacent to the printed circuit board and configured to absorb and distribute a first amount of heat from the printed circuit board, the second section disposed adjacent to the camera module and configured to absorb and distribute a second amount of heat from the camera module, the first and second amounts of heat being different amounts.

13. The video-recording doorbell of claim 12, wherein the first and second sections of the heat sink together form a substantially obround shape in an xy-plane defined by the x-axis and the y-axis.

14. The video-recording doorbell of claim 12, wherein the first section of the heat sink is longer than the second section along the y-axis by at least a factor of two.

15. The video-recording doorbell of claim 12, wherein the first section of the heat sink includes a base surface and side walls that extend outwardly along the z-axis from the base surface, the side walls configured to transfer heat toward lateral sides of the housing, which are separated by the width of the housing.

16. The video-recording doorbell of claim 12, wherein the board- resistor heaters thermally connect to the first section of the heat sink via a thermal interface material.

17. The video-recording doorbell of claim 1, wherein the button subassembly includes:
a button board having an electrical pattern for initiating the chime event;
a dome configured to complete a circuit when forced to contact the electrical pattern;
an elastic button that is collapsible to apply force to the dome to cause the dome to contact the electrical pattern and complete the circuit;
a light guide disposed adjacent to the elastic button; and
a button cap forming a pressable button on the front exterior surface of the housing.

18. The video-recording doorbell of claim 17, further comprising:
a first seal disposed between the button board and a front housing component of the housing; and
a second seal disposed between the button board and the elastic button, wherein the first and second seals prevent water ingress in the housing between the housing and a button cap of the button subassembly from reaching the electrical pattern on the button board.

19. The video-recording doorbell of claim 1, further comprising:
an infrared cover disposed at the first end of the housing, the infrared cover configured to be transparent to infrared light; and
a camera lens extending through an opening in the infrared cover.

20. The video-recording doorbell of claim 19, wherein the camera module includes a lens retainer disposed between the camera lens and the infrared cover.

* * * * *